United States Patent
Murata et al.

(10) Patent No.: US 7,265,999 B2
(45) Date of Patent: Sep. 4, 2007

(54) POWER SUPPLY REGULATOR CIRCUIT AND SEMICONDUCTOR DEVICE

(75) Inventors: Kazuhiro Murata, Osaka (JP); Yoshihiro Mori, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/393,880

(22) Filed: Mar. 31, 2006

(65) Prior Publication Data

US 2006/0250823 A1 Nov. 9, 2006

(30) Foreign Application Priority Data

Apr. 6, 2005 (JP) .............................. 2005-109288

(51) Int. Cl.
  *H02M 3/335* (2006.01)
(52) U.S. Cl. .......................................... 363/16; 363/97
(58) Field of Classification Search .................. 363/15, 363/16, 20, 21.01, 95, 97, 131
  See application file for complete search history.

(56) References Cited

U.S. PATENT DOCUMENTS 6,333,624 B1 * 12/2001 Ball et al. .................... 323/284
6,625,044 B2 * 9/2003 Lin ............................. 363/49
6,995,986 B2 * 2/2006 Balakrishnan et al. ......... 363/16
7,064,967 B2 * 6/2006 Ichinose et al. .......... 363/56.01

FOREIGN PATENT DOCUMENTS

JP    2003189612 A    7/2003

* cited by examiner

*Primary Examiner*—Adolf Berhane
(74) *Attorney, Agent, or Firm*—Steptoe & Johnson LLP

(57) ABSTRACT

A power supply regulation circuit is provided which can achieve a preferable constant current drooping characteristic without the need for a constant current control circuit on the secondary side. During a constant current operation, a switching element (1) is turned on so as to keep constant the on duty of secondary current passing through a secondary winding (110B) of a transformer (110), so that a constant current drooping characteristic is achieved. Further, at this moment, a current limit dictating the maximum value of drain current (ID) passing through the switching element (1) is changed between first and second levels during the on time of the switching element such that the drain current (ID) has a constant peak value.

12 Claims, 19 Drawing Sheets

(1) CONSTANT VOLTAGE REGION 1
    ··· PEAK CURRENT CONTROL
(2) CONSTANT VOLTAGE REGION 2
    ···FIXED PEAK CURRENT/FREQUENCY CONTROL
(3) BORDERLINE REGION BETWEEN CONSTANT VOLTAGE REGION AND
    CONSTANT CURRENT REGION
    ···ON DUTY OF SECONDARY CURRENT REACHES SET VALUE
(4) CONSTANT CURRENT REGION
    ···FIXED PEAK CURRENT/FIXED ON DUTY OF SECONDARY CURRENT

OVERCURRENT DETECTION DELAY TIME Td = 150ns

ILIIT1 : ILIMIT HAVING Ip = 1A RELATIVE TO GIVEN INPUT VOLTAGE VIN
ILIIT2 : ILIMIT HAVING MINIMUM ERROR RELATIVE TO Ip = 1A, WITHIN RANGE OF 1 TO 4.5s
Ip2 : Ip OF ILIMIT2

POWER SUPPLY REGULATOR CIRCUIT AND SEMICONDUCTOR DEVICE

FIELD OF THE INVENTION

The present invention relates to a power supply regulation circuit and a semiconductor device which have a constant current drooping characteristic as an output characteristic.

BACKGROUND OF THE INVENTION

Conventionally, switching power supplies have been widely available as a power supply regulation circuit for a charger, each of which achieves a constant current drooping characteristic by means of a constant current control circuit provided on the secondary side. The switching power supply comprises, on the secondary side, a resistor for detecting an output current, a constant current control circuit for controlling current passing through the resistor to a constant level, and a photocoupler for transmitting the signal of the constant current control circuit to the primary side. When the output current is equal to or higher than a fixed value, the constant current control circuit is operated. According to the switching power supply having such a constant current drooping characteristic, batteries or the like can be charged with a constant current by using the constant current drooping characteristic.

Japanese Patent Laid-Open No. 2003-189612 proposes a switching power supply for achieving a constant current drooping characteristic without the provision of a constant current control circuit. The conventional switching power supply will be described below.

In the conventional switching power supply, a current limit dictating the maximum value of element current passing through a switching element is reduced as the output voltage reduces during a constant current operation, so that the constant current drooping characteristic is achieved.

FIG. 16 is a block diagram showing the configuration of the conventional switching power supply.

In FIG. 16, a control circuit 200 comprises, as input/output parts, a PIN terminal serving as a start-up power supply input part, a VCC terminal serving as an auxiliary power supply voltage input part, a CS terminal serving as a current detection/input part, an OUT terminal serving as a switching element driving/output part, and a GND terminal serving as the GND output part of the control circuit. Further, the control circuit 200 comprises an oscillator circuit. The control circuit 200 drives the gate of a switching element (MOSFET) 210 connected to the OUT terminal and controls the switching operation of the switching element 210.

The switching element 210 controls the on/off of current passing through the switching element 210 from a primary winding 220A of a transformer 220. Element current (drain current) ID passing through the switching element 210 forms a triangular wave which inclines in proportion to input voltage VIN due to the inductance of the primary winding 220A.

A rectifying/smoothing circuit comprising a diode 231 and a capacitor 232 converts alternating-current power, which is generated on a secondary winding 220B of the transformer 220 in response to the switching operation of the switching element 210, to direct-current power and supplies the power to a load 233.

A rectifying/smoothing circuit comprising a diode 241 and a capacitor 242 is used as the auxiliary power supply part and the output voltage detection part of the control circuit 200. The rectifying/smoothing circuit converts alternating-current power, which is generated on an auxiliary winging 220C of the transformer 220 in response to the switching operation of the switching element 210, to direct-current power and supplies the power to the VCC terminal through a resistor 243 and a capacitor 244. An alternating-current voltage generated on the auxiliary winging 220C is proportionate to an alternating-current voltage generated on the secondary winding 220B.

The control circuit 200 detects the drain current ID passing through the switching element 210, based on the voltage of the CS terminal fed with voltage generated on a resistor 250. The control circuit 200 has an overcurrent protection function for preventing overcurrent in the switching element 210. The overcurrent protection function is provided for automatically turning off the switching element 210 when a peak value Ip of the drain current ID increases to a current limit ILIMIT.

When the voltage of the VCC terminal (VCC voltage) is higher than a fixed voltage, the control circuit 200 reduces the on duty of the switching element 210 as the VCC voltage increases, so that a constant voltage characteristic is achieved.

Conversely when the VCC voltage is lower than the fixed voltage, the control circuit 200 reduces the current limit ILIMIT as current passing through the VCC terminal decreases, so that a constant current drooping characteristic is achieved. In this case, in order to keep an output current IO constant, the current limit ILIMIT is changed as a function of current passing through the VCC terminal.

Referring to the accompanying drawings, the following will describe the operations of the switching power supply thus configured. FIG. 17 is a timing chart showing the operations of the parts of the conventional switching power supply.

When the VCC voltage is higher than a fixed voltage VCC_A, the switching power supply reduces an on duty Don of the switching element 210 as the VCC voltage increases, so that a constant voltage characteristic is achieved.

When a load increases, the peak value Ip of the drain current ID passing through the switching element 210 is increased to the current limit ILIMIT, output power PO is maximized, and then the output voltage VO is reduced, the VCC voltage decreases in response to the reduction.

Thereafter, when the VCC voltage falls below the fixed voltage VCC_A, the switching power supply reduces the current limit ILIMIT according to a reduction of current passing through the VCC terminal, so that a constant current drooping characteristic is achieved. In this case, in order to keep the output current IO constant, the switching power supply changes the current limit ILIMIT as a function of current passing through the VCC terminal.

As described above, in the conventional switching power supply which achieves a constant current drooping characteristic without the need for a constant current control circuit, the maximum output power is determined by the current limit ILIMIT and an overload is detected.

In an actual circuit, however, the peak value Ip of the drain current ID passing through the switching element is higher than the current limit ILIMIT. This is because the switching element is not turned off immediately after the detection of the drain current ID having increased to the current limit ILIMIT. To be specific, a certain delay time called an overcurrent detection delay time Td is present between the detection of the drain current ID having increased to the current limit ILIMIT and the time when the switching element is actually turned off.

FIG. 18A shows the waveforms of the drain current ID when the current limit ILIMIT is constant relative to a given input voltage VIN. As described above, the drain current ID forms a triangular wave which inclines in proportion to the input voltage VIN. Meanwhile, the overcurrent detection delay time Td is constant. Thus when the current limit ILIMIT is constant relative to a given input voltage VIN, an increase in the current value of the drain current ID inevitably changes with the input voltage VIN in the overcurrent detection delay time Td. In other words, even when the current limit ILIMIT is constant, the peak value Ip of the drain current ID changes with the input voltage VIN. To be specific, as shown in FIG. 18A, a high input voltage VIN increases the inclination of the drain current ID and the peak value Ip of the drain current ID. A low input voltage VIN reduces the inclination of the drain current ID and the peak value Ip.

Therefore, in the case of a high input voltage VIN, the maximum value of the drain current ID is high as compared with a low input voltage VIN, and the maximum output power PO increases. This means that overload detection moves to the heavy load side. Thus, as shown in FIG. 19A, in the case of a high input voltage VIN, the output current IO in a constant current operation is high as compared with a low input voltage VIN. This relationship will be described below using the equation of the output power PO.

The output power PO in a discontinuous mode is expressed as below:

$$PO = A \times L \times Ip^2 \times fosc$$

where 'fosc' represents the oscillation frequency of the switching element, 'A' represents a constant, 'L' represents the inductance of the primary winding of the transformer, and Ip represents the peak value of the actual drain current ID.

As is evident from this equation, as long as the oscillation frequency fosc and the peak value Ip of the drain current ID passing through the switching element are constant, the output power PO remains constant even when the input voltage VIN changes. On the other hand, even when the oscillation frequency fosc remains constant, the output power PO changes with a change of the peak value Ip of the drain current ID. Therefore in the case where the current limit ILIMIT is constant relative to a given input voltage as described above, the maximum value of the drain current ID determined by the current limit ILIMIT changes with the input voltage VIN and thus the maximum output power PO also changes. Hence, as shown in FIG. 19A, in the case of a high input voltage VIN, overload detection moves to the heavy load side and the output current IO in a constant current operation is high as compared with a low input voltage VIN.

As described above, when the current limit ILIMIT is constant, the maximum value of the drain current ID changes with the input voltage VIN and the maximum output power PO also changes. Thus, the output current IO changes with the input voltage VIN in a constant current operation.

In order to solve this problem of the conventional switching power supply, the following technique is used: as shown in FIG. 20, in the conventional switching power supply, the current limit ILIMIT is linearly increased for a certain time after the switching element is turned on, and then the current limit ILIMIT is reduced to a value obtained when the switching element is turned on.

When the inclination of the increase of the sawtooth current limit ILIMIT is set at a proper value, as shown in FIG. 18B, a high input voltage VIN has a low current limit ILIMIT relative to the drain current ID, and a low input voltage VIN has a high current limit ILIMIT relative to the drain current ID. Therefore a change in the peak value Ip of the drain current ID according to the input voltage VIN decreases and thus a change in the output current IO also decreases in a constant current operation.

Strictly speaking, when the overcurrent detection delay time Td is constant, the current limit ILIMIT which keeps the peak value Ip of the drain current ID constant relative to a given input voltage VIN does not linearly change with time. In other words, it is necessary to change the current limit ILIMIT as expressed in the equation below:

$$ILIMIT(t) = Ip \times (t - Td)/t$$

where 't' represents a time from when the switching element is turned on.

A current limit ILIMIT1 shown in FIG. 21 represents a current limit ILIMIT which sets, when the overcurrent detection delay time Td is 150 ns, the peak value Ip of the drain current ID at 1 A regardless of an input voltage. As shown in FIG. 21, the current limit ILIMIT1 is a function which simply increases and forms a convex shape with a primary time derivative acting as a positive derivative and a secondary time derivative acting as a negative derivative. The current limit ILIMIT1 does not linearly change with time.

On the other hand, a current limit ILIMIT2 is a current limit ILIMIT which linearly changes with time. The current limit ILIMIT2 is set such that the peak value Ip of the drain current ID has an error of about ±3% when the overcurrent detection delay time Td is 150 ns and an on time Ton of the switching element changes over a range of 1.0 to 4.5 µs. Further, a peak value Ip2 is an actual peak value Ip when the current limit ILIMIT2 serves as the current limit ILIMIT.

In this case, the on time Ton is a period during which the switching element is turned on. Strictly speaking, the on time Ton is a time during which the switching element is turned on, the drain current ID increases to the current limit ILIMIT, and then the switching element is turned off after a delay of the overcurrent detection delay time Td.

As shown in FIG. 21, even the current limit ILIMIT2 linearly changing relative to the on time Ton of the switching element can reduce the dependence of the peak value Ip of the drain current ID on the input voltage within a predetermined range of the on time Ton. The range of the on time Ton (1.0 to 4.5 µs) in this example is a 4.5-times range which can sufficiently respond to, for example, the input voltage range of world wide input (AC 85 to 282 V). Thus in the conventional switching power supply, the inclination of the increase of the current limit ILIMIT is set at a proper value, for example, like the current limit ILIMIT2 shown in FIG. 21.

However, in the case where the on time Ton is short relative to the overcurrent detection delay time Td, that is, "Td/Ton" is large, it is difficult to reduce the input voltage dependence of the peak value Ip of the drain current ID passing through the switching element. Thus the long overcurrent detection delay time Td and the short on time Ton are disadvantageous to a reduction of the input voltage dependence of the peak value Ip of the drain current ID. The input voltage dependence is reduced by the current limit ILIMIT linearly changing with time. This is proved from a fact that the peak value Ip2 of FIG. 21 is considerably deviated from 1 A at the on time Ton of 1 μs or less.

In the conventional switching power supply, as shown in FIG. 17, the current limit ILIMIT is reduced to supply lower energy to the secondary side, so that a constant current drooping characteristic is achieved. Therefore, in the conventional switching power supply, the peak value Ip of the drain current ID passing through the switching element is reduced and the on time Ton is shortened.

As described above, as the on time Ton becomes shorter, the peak value Ip of the drain current considerably changes. Thus in the conventional switching power supply, it is quite difficult to make the output current IO constant relative to a change of the input voltage VIN and a load.

FIG. 18C shows the waveforms of the drain current ID when the current limit ILIMIT decreases and the peak value Ip of the drain current ID passing through the switching element decreases.

As shown in FIG. 18C, in the case where the peak value Ip of the drain current ID decreases, the on time Ton of the switching element is shortened, and the inclination of the current limit ILIMIT is the same as the current limit ILIMIT shown in FIG. 18B, the peak value Ip of the drain current ID changes with the input voltage VIN. For this reason, in the conventional switching power supply which reduces the sawtooth current limit ILIMIT during a constant current operation and achieves a constant current drooping characteristic, it is expected that the constant current drooping characteristic is shaped like FIG. 19B. In other words, it is expected that the output current IO changes with the input voltage VIN when the output voltage VO decreases.

DISCLOSURE OF THE INVENTION

In consideration of the problem, it is an object of the present invention to provide a power supply regulation circuit which makes it possible to eliminate the need for a constant current control circuit, a photocoupler, and a resistor for detecting output current, reduce a change of output current changing with input voltage in a constant current region, and achieve a preferable constant current drooping characteristic.

In order to attain the object, in the present invention, a switching element is turned on so as to keep the on duty of secondary current at a fixed value in a constant current region, the secondary current starting passing through a secondary wiring (second wiring) when the switching element is turned off. When an element current passing through the switching element reaches a current limit changing between a first level and a second level during the on time of the switching element, the switching element is turned off.

The power supply regulation circuit of the present invention comprising:

a transformer having a first winding fed with input voltage and a second winding for generating output voltage, a switching element which includes three terminals of a first terminal, a second terminal, and a control terminal, and oscillates so as to electrically couple or decouple the first and second terminals in response to a control signal received on the control terminal, so that the on/off of current passing through the first winding is controlled, and a control circuit for generating the control signal, the power supply regulation circuit controlling an energy supply to the first and second windings by controlling the oscillation of the switching element, and supplying a constant output current to a load connected to the second winding, the control circuit having:

the element current detection function of detecting an element current passing through the switching element, the current limit varying function of changing, between a first level and a second level higher than the first level, a current limit dictating the maximum value of the element current in a period during which the switching element couples the first and second terminals, the function of outputting a signal for turning off the switching element when the element current reaches the current limit changing between the first and second levels, the function of detecting the on duty of secondary current passing through the second winding, and outputting a signal for turning on the switching element so as to keep the on duty of the secondary current at a fixed value, and the function of generating the control signal based on the signal for turning on the switching element and the signal for turning off the switching element.

According to the power supply regulation circuit of the present invention, by changing the detected value of the element current having been detected by the element current detection function, the current limit varying function changes the current limit between the first level and the second level in a period during which the switching element couples the first and second terminals.

According to the power supply regulation circuit of the present invention, by changing the reference value for determining the current limit, the current limit varying function changes the current limit between the first level and the second level in the period during which the switching element couples the first and second terminals.

According to the power supply regulation circuit of the present invention, the transformer further comprises a third winding for detecting a voltage generated on the second winding, and the control circuit detects the on duty of the secondary current based on a voltage generated on the third winding.

According to the power supply regulation circuit of the present invention, the control circuit further has the function of changing the energy supply so as to keep the output voltage constant when the on duty of the secondary current is equal to or lower than the fixed value.

According to the power supply regulation circuit of the present invention, when the on duty of the secondary current is equal to or lower than the fixed value, the control circuit changes the energy supply to keep the output voltage constant, the energy supply being changed by changing the oscillation frequency of the switching element.

According to the power supply regulation circuit of the present invention, when the on duty of the secondary current is equal to or lower than the fixed value, the control circuit changes the energy supply to keep the output voltage constant, the energy supply being changed by changing, while keeping the oscillation frequency of the switching element constant, the period during which the switching element couples the first and second terminals.

According to the power supply regulation circuit of the present invention, when the on duty of the secondary current is equal to or lower than the fixed value and the output current is lower than a predetermined value, the control circuit changes the energy supply to keep the output voltage constant, the energy supply being changed by changing, while keeping the oscillation frequency of the switching element, the period during which the switching element couples the first and second terminals, and when the on duty of the secondary current is equal to or lower than the fixed value and the output current is equal to or higher than the predetermined value, the control circuit changes the energy supply to keep the output voltage constant, the energy supply being changed by changing the oscillation frequency of the switching element.

According to the power supply regulation circuit of the present invention, the control circuit is formed on the same semiconductor substrate.

According to the power supply regulation circuit of the present invention, the switching element and the control circuit are formed on the same semiconductor substrate.

According to a semiconductor device of the present invention, the control circuit is formed on the same semiconductor substrate.

According to the semiconductor device of the present invention, the switching element and the control circuit are formed on the same semiconductor substrate.

As described above, in the conventional switching power supply, the drain current is detected, the current limit is reduced as the output voltage reduces when the drain current increases to the current limit, and thus the peak value of the drain current is reduced, so that a constant current drooping characteristic is achieved. In the power supply regulation circuit of the present invention, the switching element is turned on so as to keep the on duty of the secondary current at the fixed value, and the switching element is turned off when the element current reaches the current limit changing between the first and second levels during the on time of the switching element. Since the constant current drooping characteristic is achieved in a different manner in the power supply regulation circuit of the present invention, the on time of the switching element is not shortened, unlike the conventional switching power supply, even when the output voltage decreases in a constant current region, and the input voltage does not change the output current.

Further, according to the power supply regulation circuit of the present invention, as long as the inclination of the current limit changing during the on time of the switching element is set at a proper value, the output current in the constant current region remains almost constant regardless of the input voltage.

Moreover, the power supply regulation circuit of the present invention can eliminate the need for a constant current control circuit, a photocoupler, and a resistor for detecting output current and reduce a change of output current changing with input voltage in a constant current area, so that a preferable constant current drooping characteristic can be achieved. Thus the power supply regulation circuit of the present invention makes it possible to achieve a constant current drooping characteristic with low cost, the minimum number of components, and the minimum power loss. Therefore, the power supply regulation circuit of the present invention makes it possible to obtain a sufficiently accurate switching power supply for a charger with a small number of components, and achieve low cost, miniaturization, and energy conservation for the switching power supply for a charger. For this reason, the power supply regulation circuit of the present invention is useful for a charger for portable equipment including a cellular phone and a digital still camera.

According to the power supply regulation circuit of the present invention, a change in the voltage of the third winding of the transformer is detected to detect the on duty of the secondary current, so that control can be performed so as to keep the on duty of the secondary current at the fixed value with a low power loss and a few additional components while keeping insulation between the primary side and the secondary side of the transformer.

According to the power supply regulation circuit of the present invention, the output voltage is kept constant until the on duty of the secondary current reaches the fixed value, so that one of a constant current drooping characteristic and a constant voltage drooping characteristic can be achieved according to the state of the load.

According to the power supply regulation circuit of the present invention, the output voltage is controlled to be kept constant by changing the oscillation frequency of the switching element, so that switching can be performed from a constant voltage region to a constant current region.

According to the power supply regulation circuit of the present invention, the output voltage is kept constant by changing the on time of the switching element while keeping the oscillation frequency constant, so that ringing of the transformer can be prevented.

A semiconductor device of the present invention can achieve space saving and low cost for the power supply regulation circuit.

DESCRIPTION OF THE EMBODIMENTS

The following will describe a power supply regulation circuit according to an embodiment of the present invention with reference to the accompanying drawings. The power supply regulation circuit is a switching power supply in the present embodiment.

Figure 1:
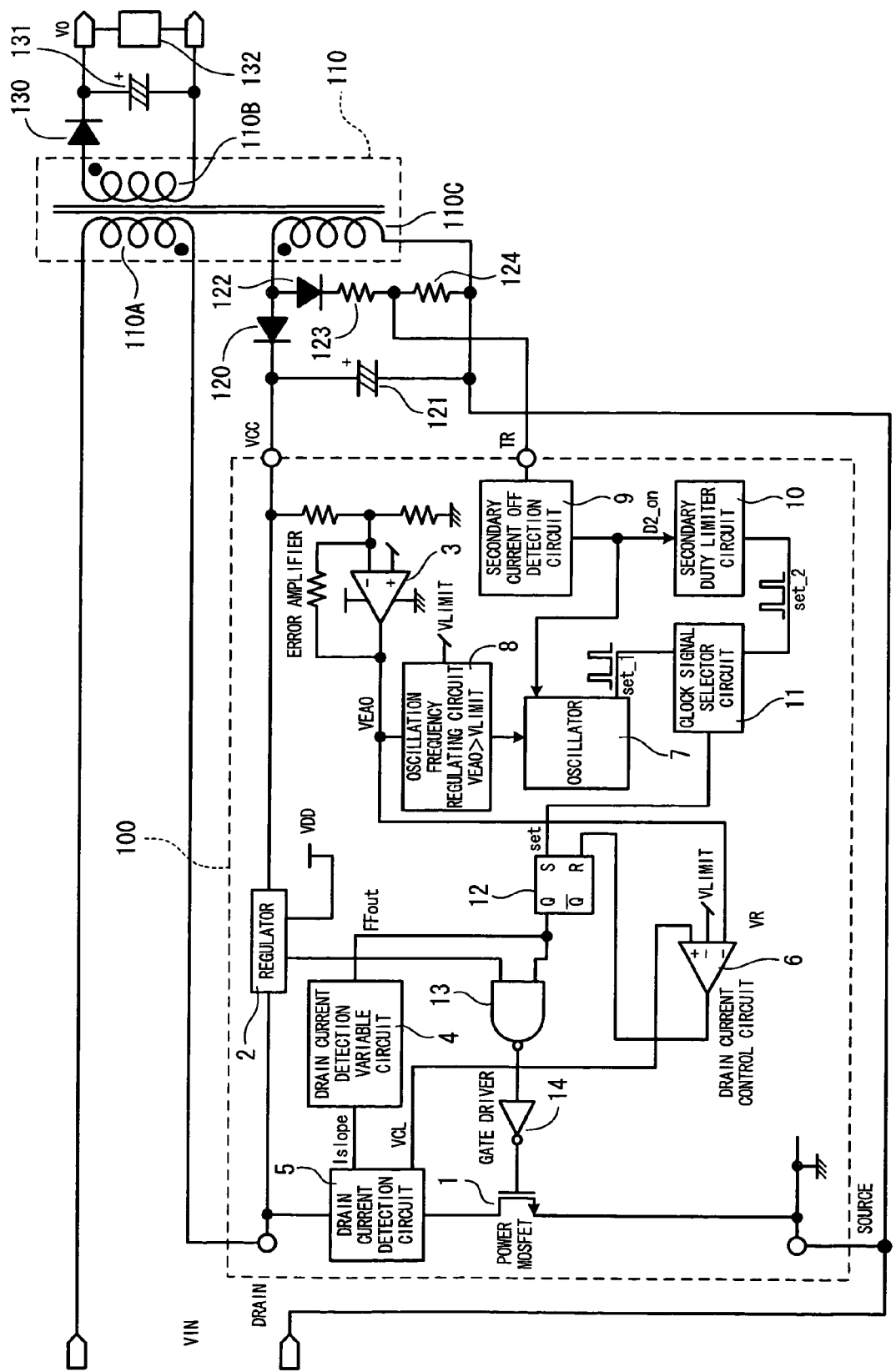
FIG. 1 is a block diagram showing a structural example of a switching power supply according to an embodiment of the present invention.

FIG. 1 is a block diagram showing a structural example of the switching power supply according to the present embodiment.

In FIG. 1, a switching element 1 is a power MOSFET which has three terminals of DRAIN terminal acting as an input terminal (first terminal), SOURCE terminal acting as an output terminal (second terminal), and GATE terminal acting as a control terminal. The switching element 1, in response to a control signal received on the control terminal, oscillates so as to electrically couple or decouple the input terminal and the output terminal. Further, the switching element 1 controls, according to the oscillating operation, the on/off of current passing through a primary winding 110A of a transformer 110.

A semiconductor device 100 for controlling the switching power supply comprises the switching element 1 and a control circuit. The control circuit generates the control signal to control the switching operation (oscillating operation) of the switching element 1. The semiconductor device 100 has four terminals of the input terminal (DRAIN terminal) of the switching element 1 as an external input terminal, an auxiliary power supply voltage input terminal (VCC terminal) as an external input terminal, a secondary current off-timing detection terminal (TR terminal), and a GND terminal (SOURCE terminal) of the control circuit, the GND terminal also acting as the output terminal of the switching element 1.

The transformer 110 has the primary winding (first winding) 110A fed with input voltage VIN, a secondary winding (second winding) 110B for outputting output voltage VO, and an auxiliary winding (third winding) 110C for detecting voltage generated on the secondary winding 110B. Further, the primary winding 110A and the secondary winding 110B are opposite in polarity and the switching power supply is a flyback power supply.

A rectifying/smoothing circuit comprising a diode 120 and a capacitor 121 is connected to the auxiliary winding 110C. The rectifying/smoothing circuit is used as the auxiliary power supply part of the semiconductor device 100. In other words, the auxiliary winding 110C has the same polarity as the secondary winding 110B. The auxiliary power supply part rectifies and smoothes an alternating voltage (auxiliary side alternating voltage), which is generated on the auxiliary winding 110C in response to the switching operation of the switching element 1, generates an auxiliary power supply voltage VCC proportionate to the output voltage VO, and applies the voltage VCC to the VCC terminal.

Resistors 123 and 124 are connected to the auxiliary winding 110C via a diode 122. The junction point of the resistors 123 and 124 is connected to the TR terminal. The alternating voltage generated on the auxiliary winding 110C is rectified by the diode 122, divided by the resistors 123 and 124, and applied to the TR terminal. The voltage applied to the TR terminal (hereinafter, referred to as TR terminal voltage VTR) is used to detect the timing of the end of the application (hereinafter, referred to as off timing) of secondary current passing through the secondary winding 110B in response to the switching operation of the switching element 1.

A rectifying/smoothing circuit comprising a diode 130 and a capacitor 131 is connected to the secondary winding 110B. The rectifying/smoothing circuit is used as an output voltage generating part of the switching power supply. In other words, the output voltage generating part rectifies and smoothes an alternating voltage (secondary side alternating voltage), which is generated on the secondary winding 110B in response to the switching operation of the switching element 1, generates the output voltage VO (second direct current voltage), and applies the output voltage VO to a load 132.

Figure 2:
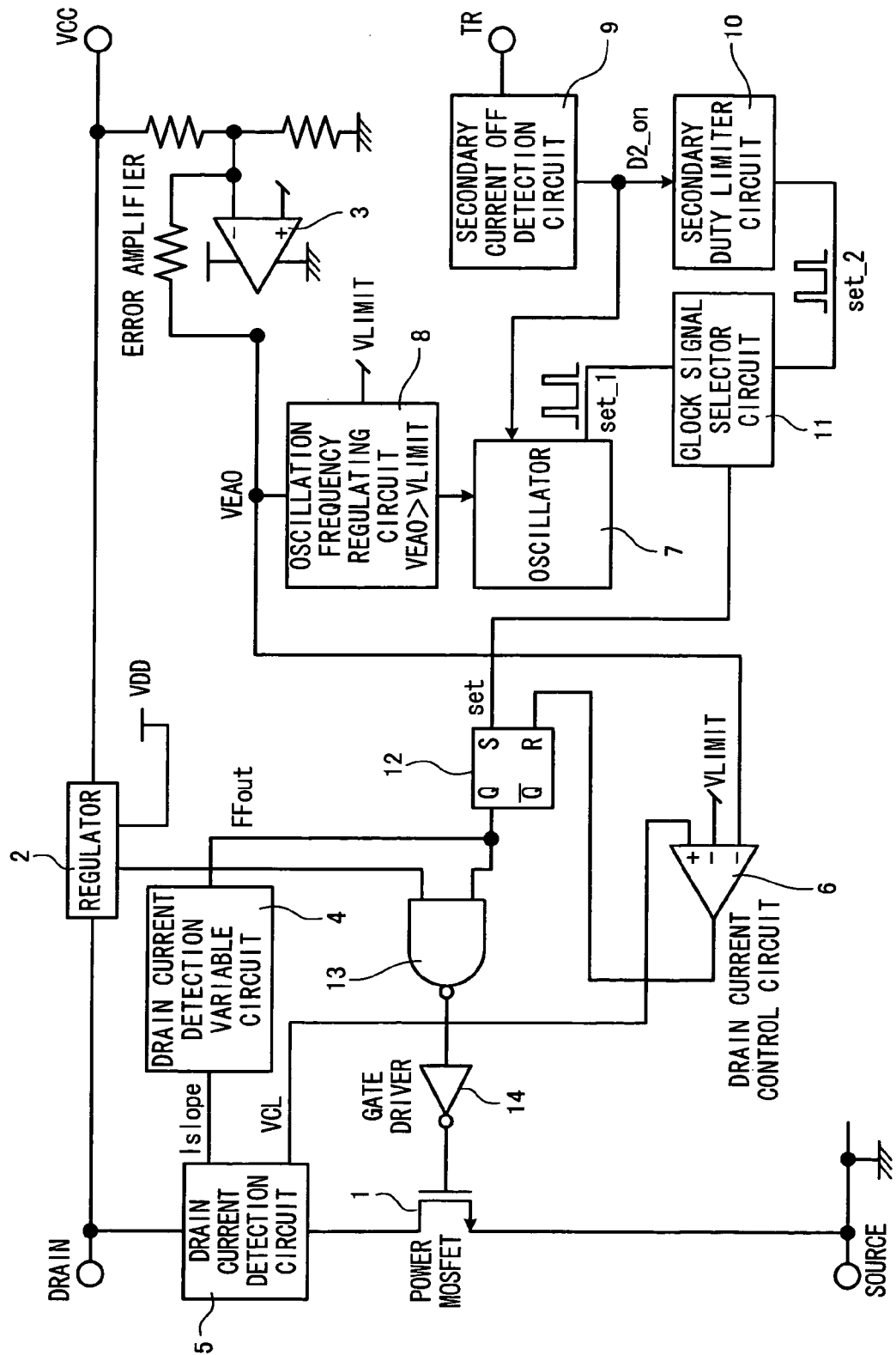
FIG. 2 is a block diagram showing a structural example of a semiconductor device for controlling the switching power supply according to the embodiment.

FIG. 2 is a block diagram showing a structural example of the semiconductor device 100 for controlling the switching power supply, the semiconductor device 100 making up the switching power supply of the present embodiment. The semiconductor device 100 includes the switching element 1 and the control circuit. The control circuit controls an energy supply to the primary winding 110A and the secondary winding 110B of the transformer 110 by controlling the oscillation of the switching element 1, and keeps the output current IO to the load 132 almost constant in a constant current area.

In FIG. 2, a regulator 2 supplies current from the DRAIN terminal or the VCC terminal to an internal circuit power supply VDD of the semiconductor device 100 and stabilizes the voltage of the internal circuit power supply VDD at a fixed value.

In other words, before the switching operation of the switching element 1 is started, the regulator 2 supplies current from the DRAIN terminal to the internal circuit power supply VDD, supplies current also to the capacitor 121 of the auxiliary power supply part via the VCC terminal, and increases the voltage of the internal circuit power supply VDD and the auxiliary power supply voltage VCC. And then, when the voltage of the internal circuit power supply VDD reaches the fixed value, the regulator 2 switches an output signal to an NAND circuit 13 from low level to high level and starts the switching operation of the switching element 1.

After the switching operation of the switching element 1 is started, the regulator 2 stops supplying current from the DRAIN terminal to the VCC terminal and determines a terminal for supplying current to the internal circuit power supply VDD according to the value of the auxiliary power supply voltage VCC. In other words, when the auxiliary power supply voltage VCC is equal to or higher than the fixed value, the regulator 2 supplies current from the VCC terminal to the internal circuit power supply VDD. The power consumption of the semiconductor device 100 is reduced by the operation of the regulator 2. On the other hand, when the auxiliary power supply voltage VCC falls below the fixed value, for example, when the direct current output voltage VO decreases in a constant current region, the regulator 2 supplies current from the DRAIN terminal to the internal circuit power supply VDD. In this way, the regulator 2 stabilizes the internal circuit power supply VDD at the fixed value.

An error amplifier 3 compares a stabilization reference voltage and the auxiliary power supply voltage VCC and generates an error voltage signal VEAO according to a difference between the voltages. A drain current detection variable circuit (current limit variable circuit) 4 is fed with the output signal (FFout signal) of a flip-flop circuit 12, detects the timing of turning on the switching element 1 and the timing of turning off the switching element 1, generates a current signal (current limit variable signal) Islope changing according to the detected time, and outputs the signal to a drain current detection circuit 5. The drain current detection circuit (element current detection circuit) 5 has the element current detection function of detecting a drain current (element current) ID passing through the switching element 1. The drain current detection circuit 5 generates an element current detection signal VCL which is set at a voltage level corresponding to the drain current ID and the current limit variable signal Islope.

Figure 8:
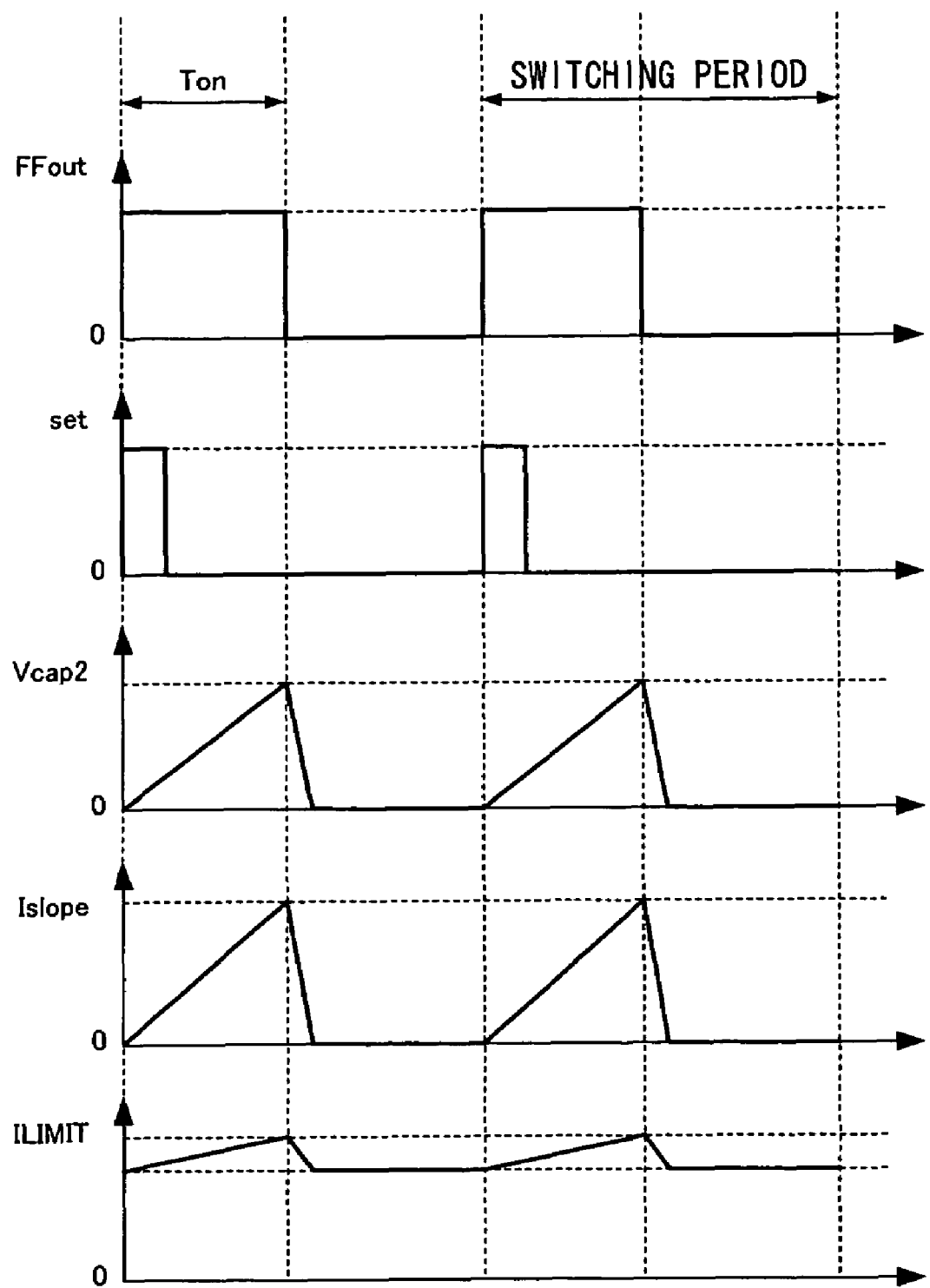
FIG. 8 is a diagram for explaining the operations of the drain current detection variable circuit in the switching power supply according to the embodiment.

In other words, the drain current detection variable circuit 4 changes, in response to the current limit variable signal Islope, the detected value of the drain current ID detected by the drain current detection circuit 5 and transforms current limit ILIMIT into a sawtooth waveform linearly changing with time as shown in FIG. 8. The current limit ILIMIT regulates the maximum value of the drain current ID when the error voltage signal VEAO exceeds an overcurrent protection reference voltage VLIMIT.

As described above, in the switching power supply, when the error voltage signal VEAO exceeds the overcurrent protection reference voltage VLIMIT, the current limit ILIMIT forms a sawtooth waveform, which linearly changes with time, by means of the current limit varying function of the drain current detection variable circuit 4, and the actual peak value Ip of the drain current ID determined in consideration of an overcurrent detection delay time Td is kept almost constant regardless of the input voltage VIN. Hence in the switching power supply, the output current IO in the constant current region is kept almost constant regardless of the input voltage VIN.

A drain current control circuit (element current control circuit) 6 is fed with, as a reference voltage, the overcurrent protection reference voltage VLIMIT and the error voltage signal VEAO outputted from the error amplifier 3. When the voltage of the element current detection signal VCL reaches the lower one of the overcurrent protection reference voltage VLIMIT and the voltage of the error voltage signal VEAO, the drain current control circuit 6 outputs a signal for determining the turn off of the switching element 1 (in this case, a high level signal) to the reset terminal of the flip-flop circuit 12.

An oscillator 7 generates a clock signal set_1 (first clock signal) which has a fixed period and determines the turn on of the switching element 1, and outputs the signal to a clock signal selector circuit 11. The clock signal set_1 determines the oscillation frequency of the switching element 1 in a constant voltage region.

When the voltage of the error voltage signal VEAO outputted from the error amplifier 3 exceeds the overcurrent protection reference voltage VLIMIT, an oscillation frequency regulating circuit 8 increases the frequency of the clock signal set_1 (shortens the period) according to a difference between the voltages. In other words, only when the voltage of the error voltage signal VEAO outputted from the error amplifier 3 is higher than the overcurrent protection reference voltage VLIMIT, the oscillation frequency regulating circuit 8 outputs to the oscillator 7 a signal with a current value corresponding to the voltage difference. The larger voltage difference, the higher frequency of the clock signal set_1. Thus the output voltage VO is stabilized at a fixed value even when the load 132 increases.

A secondary current off detection circuit 9 is connected to the TR terminal. The secondary current off detection circuit 9 detects the timing of turning off secondary current based on TR terminal voltage VTR, that is, auxiliary side alternating voltage and outputs its output signal to the oscillator 7 and a secondary duty limiter circuit 10. Until the timing of turning off secondary current is detected after the switching element 1 is turned off, that is, in a period during which the secondary current is applied, an output signal D2_on is set at high level.

In the flyback switching power supply, when the switching element 1 is turned on, current passes through the primary winding 110A of the transformer 110 and energy is stored in the transformer 110. When the switching element 1 is turned off, energy stored in the transformer 110 is discharged and current passes through the secondary winding 110B of the transformer 110. Thereafter, when the current passing through the secondary winding 110B becomes 0, resonance occurs due to the inductance of the transformer 110 and the parasitic capacitance of the switching element 1. The resonance occurs on the windings of the transformer 110. Thus in the switching power supply, by detecting a falling edge appearing on the voltage waveform of the auxiliary winding 110C after the switching element 1 is turned off, the timing of turning off the secondary current is detected.

The secondary duty limiter circuit 10 is fed with the output signal of the secondary current off detection circuit 9, detects a period from the turn off of the switching element 1 to the end of the application of the secondary current (the on period of the secondary current), generates a clock signal set_2 (second clock signal) for turning on the switching element 1 when the secondary current has a constant on duty, and outputs the clock signal to a clock signal selector circuit 11.

As a current passing through the load 132 increases, the on period of the secondary current becomes longer. Thus the output signal set_2 of the secondary duty limiter circuit 10 has a lower frequency. The clock signal set_2 determines the oscillation frequency of the switching element 1 in the constant current region. The secondary duty limiter circuit 10 generates the clock signal set_2 so as to keep the secondary current on duty, for example, at about 50% (preferably at 50%).

The clock signal selector circuit 11 is fed with the output signal of the oscillator 7 and the output signal of the secondary duty limiter circuit 10. The clock signal selector circuit 11 generates a set signal set when being fed with the output signals, and outputs the set signal to the flip-flop circuit 12. In other words, the clock signal selector circuit 11 outputs the clock signal having a lower frequency to the flip-flop circuit 12.

In this configuration, the flip-flop circuit 12, the NAND circuit 13, and a gate driver 14 make up a switching control circuit. The switching control circuit controls the switching operation (repeatedly turns on/off) of the switching element 1 according to the set/reset state of the flip-flop circuit 12.

The NAND circuit 13 is fed with the output signal from the regulator 2 and the output signal from the flip-flop circuit 12. The output signal of the NAND circuit 13 is inputted to the gate driver 14. The gate driver 14 outputs a control signal (turn-on pulse signal) for controlling the switching operation (oscillating operation) of the switching element 1 to the control terminal (gate terminal) of the switching element 1.

In this way, the switching control circuit generates the control signal based on the signal which is outputted from the clock signal selector circuit 11 to determine the turn on of the switching element 1 and the signal which is outputted from the drain current control circuit 6 to determine the turn off of the switching element 1, and the switching control circuit controls the oscillation of the switching element 1.

The switching element 1 is repeatedly turned on and off (switching operation) in response to the turn-on pulse signal from the gate driver 14, so that the on/off of current passing through the primary winding 110A of the transformer 110 is controlled, secondary side alternating voltage is generated on the secondary winding 110B, and auxiliary side alternating voltage is generated on the auxiliary winding 110C.

As described above, when the secondary current starts passing through the secondary winding 110B of the transformer 110 after the switching element 1 is turned off and the on duty of the secondary current reaches a fixed value in the switching power supply, the switching operation of the switching element 1 is controlled so as to keep the on duty of the secondary current at the fixed value, so that a constant current operation is achieved. Hence the switching power supply makes it possible to achieve a constant current drooping characteristic with sufficient accuracy without the need for a constant current control circuit on the secondary side, a resistor for detecting an output current, or a photocoupler.

Further, in the switching power supply, when the error voltage signal VEAO exceeds the overcurrent protection reference voltage VLIMIT, the current limit ILimit dictating the maximum value of the drain current ID passing through the switching element 1 forms a sawtooth waveform which linearly changes with time as shown in FIG. 8. Thus the actual peak value Ip determined in consideration of the overcurrent detection delay time Td is kept almost constant regardless of the input voltage VIN. Therefore in the switching power supply, it is possible to reduce a change of the maximum output current PO changing with the input voltage VIN and keep the output current IO almost constant during a constant current operation regardless of the input voltage VIN.

Moreover, in the switching power supply, the oscillation frequency fosc is changed to keep the on duty of the secondary current at the fixed value, so that a constant current operation is achieved. Thus even when the output voltage VO decreases in the constant current region, the on time Ton of the switching element is not shortened. Therefore in the switching power supply, even a reduction in the output voltage VO does not change the output current IO with the input voltage VIN.

Further, in the switching power supply, the switching element 1 and the control circuit thereof are formed on the same semiconductor substrate and make up the semiconductor device 100 having the four terminals of DRAIN terminal, SOURCE terminal, VCC terminal, and TR terminal. The semiconductor device comprising these main circuit components makes it possible to reduce the number of components making up the circuits of the switching power supply and achieve miniaturization (space saving), light weight, and low cost of the switching power supply.

The present embodiment illustrates the semiconductor device in which the switching element 1 and the control circuit thereof are formed on the same semiconductor substrate. Only the control circuit may be formed on the semiconductor substrate and the switching element 1 may be attached externally.

Figure 3:
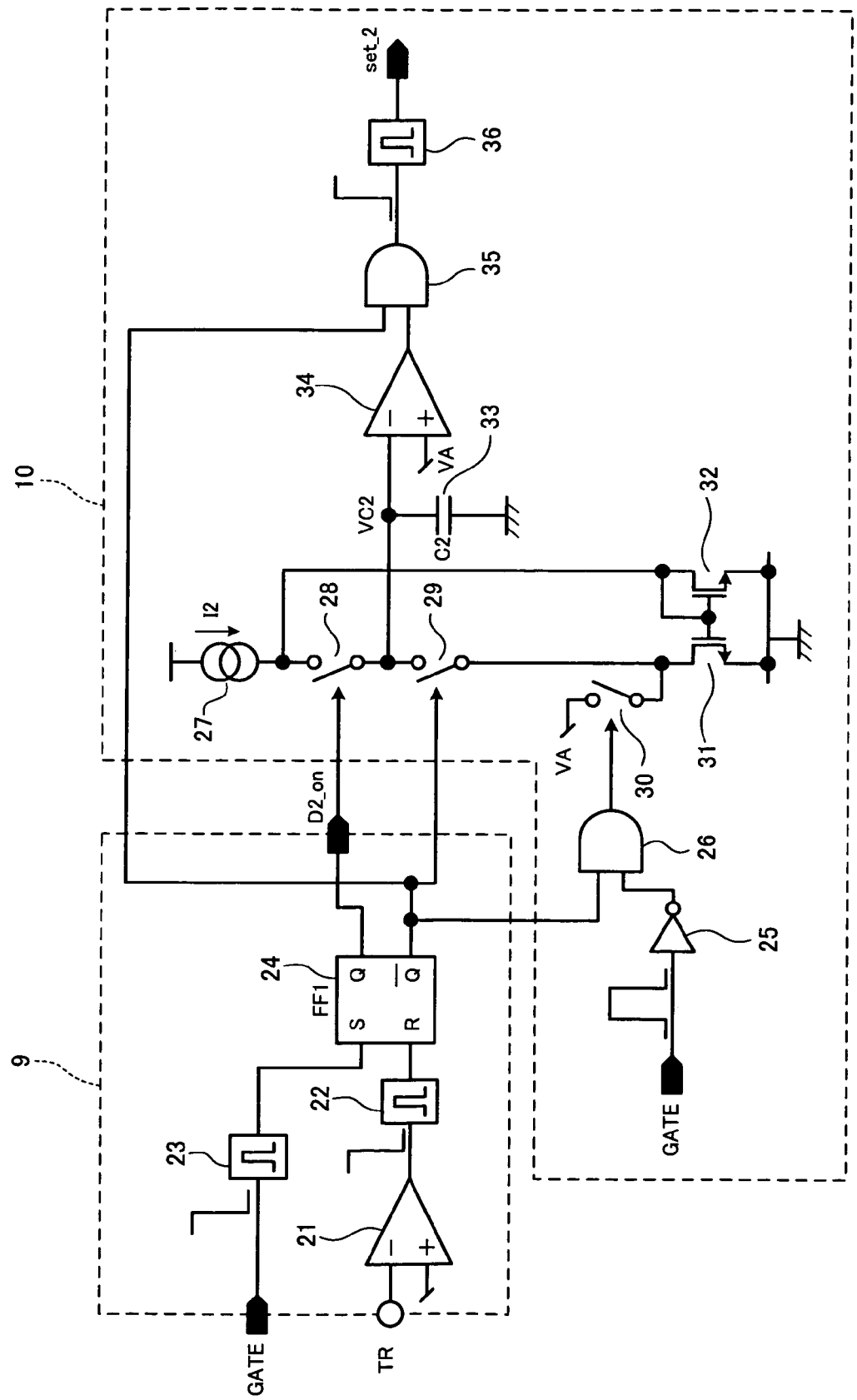
FIG. 3 is a block diagram showing a structural example of a secondary current off detection circuit and a secondary duty limiter circuit in the switching power supply according to the embodiment.

FIG. 3 is a block diagram showing a structural example of the secondary current off detection circuit 9 and the secondary duty limiter circuit 10 which make up a part of the semiconductor device 100 for controlling the switching power supply according to the present embodiment. In this example, the secondary current off detection circuit 9 and the secondary duty limiter circuit 10 enable the function of detecting the on duty of the secondary current and generating a signal for turning off the switching element 1 so as to keep the on duty of the secondary current at the fixed value.

The secondary current off detection circuit 9 comprises a comparator 21, a one-pulse signal generator circuits 22 and 23, and a flip-flop circuit 24. These elements are connected to one another as shown in FIG. 3.

The one-pulse signal generator circuit 23 is fed with the turn-on pulse signal which is the output signal of the gate driver 14, generates a one-pulse signal at the falling edge of the turn-on pulse signal, that is, when the switching element 1 is turned off, and inputs the one-pulse signal to the set terminal of the flip-flop circuit 24.

The comparator 21 compares the TR terminal voltage VTR and the reference voltage, detects a falling edge of the voltage waveform of the auxiliary winding 110C at a falling edge of the TR terminal voltage VTR, that is, after the switching element 1 is turned off, and the comparator 21 generates a detection signal and outputs the signal to the one-pulse signal generator circuit 22.

The one-pulse signal generator circuit 22 generates a one-pulse signal when the TR terminal voltage VTR falls below the reference voltage, that is, when the secondary current is turned off, and the one-pulse signal generator circuit 22 inputs the one-pulse signal to the reset terminal of the flip-flop circuit 24. Therefore, at the first falling edge of the TR terminal voltage VTR (when the secondary current is turned off) after the switching element 1 is turned off, the output signal and the inverted output signal of the flip-flop circuit 24 are inverted.

With this configuration, from the turn-off of the switching element 1 to the end of the application of the secondary current, that is, in a period during which the secondary current is applied, the one-pulse signal generator circuits 22 and 23 set the output signal of the flip-flop circuit 24 at high level ('H' signal). The inverted output signal of the flip-flop circuit 24 is set at low level ('L' signal). Then, the output signal and the inverted output signal of the flip-flop circuit 24 are inverted when the secondary current is turned off. From the input of the subsequent turn-on pulse signal to the switching element 1 to the turn-off of the switching element 1, that is, in a period during which the secondary current is not applied, the output signal of the flip-flop circuit 24 is 'L' signal and the inverted output signal of the flip-flop circuit 24 is 'H' signal.

The secondary duty limiter circuit 10 comprises an inverter circuit 25, AND circuits 26 and 35, a constant current source 27, switches 28, 29, and 30, NchMOSFETs 31 and 32, a capacitor 33, a comparator 34, and a one-pulse signal generator circuit 36. These elements are connected to one another as shown in FIG. 3.

The switches 28 and 29 are turned on and off in response to the output signal and the inverted output signal of the flip-flop circuit 24 in the secondary current off detection circuit 9. The capacitor 33 is charged and discharged by the operations of the switches 28 and 29.

In other words, from the turn-off of the switching element 1 to the end of the application of the secondary current, that is, in a period during which the secondary current is applied, the output signal of the flip-flop circuit 24 is 'H' signal and the inverted output signal of the flip-flop circuit 24 is 'L' signal, so that the switch 28 is turned on and the switch 29 is turned off. When the switch 28 is turned on and the switch 29 is turned off, the capacitor 33 is charged according to a constant current I2 of the constant current source 27 and a voltage VC2 of the capacitor 33 increases. From the end of the application of the secondary current to the input of the subsequent turn-on pulse signal and the turn-off of the switching element 1, that is, when the secondary current is not applied, the switch 28 is turned off and the switch 29 is turned on, so that the capacitor 33 is discharged. A discharge current value at this moment is determined by the constant current I2 of the constant current source 27 and a current mirror circuit made up of the NchMOSFETs 31 and 32.

In this case, when the switch 29 is turned on and the switching element 1 is turned off, the inverter circuit 25 and the AND circuit 26 turn on the switch 30. In this way, when the switch 28 is turned off, the switch 29 is turned on, and the switch 30 is turned on, that is, when the secondary current is not applied and the switching element 1 is turned off, the voltage VC2 of the capacitor 34 is kept at a reference voltage VA. Thus there is a period during which the voltage VC2 is kept at the fixed value (reference voltage VA) during the discharge period of the capacitor 33. Thus the discharge start voltage of the capacitor 33 is fixed when the switching element 1 is turned on.

The comparator 34 compares the voltage VC2 of the capacitor 33 and the reference voltage VA. When the voltage VC2 of the capacitor 33 is equal to or lower than the reference voltage VA, the output signal of the comparator 34 is set at high level. When the voltage VC2 of the capacitor 33 is equal to or higher than the reference voltage VA, the output signal of the comparator 34 is set at low level.

The output signal of the comparator 34 is outputted to the AND circuit 35. The AND circuit 35 is fed with the output signal of the comparator 34 and the inverted output signal of the flip-flop circuit 24 in the secondary current off detection circuit 9. The output signal of the AND circuit 35 is outputted to the one-pulse signal generator circuit 36. At the inversion of the output signal of the AND circuit 35 from low level to high level, that is, in a period during which the secondary current is not applied, the one-pulse signal generator circuit 36 generates a one-pulse signal (set_2) when the voltage VC2 of the capacitor 33 reaches the reference voltage VA, and outputs the signal to the clock signal selector circuit 11.

With this configuration, the capacitor 33, which is fixed at the reference voltage VA when the switching element 1 is turned on, starts discharging concurrently with the turn-on of the switching element 1. Then, the capacitor 33 is switched from discharging to charging when the switching element 1 is turned off, is charged during the application of the secondary current, and is switched from charging to discharging again when the secondary current is turned off. Thereafter, when the voltage VC2 of the capacitor 33 reaches the reference voltage VA again, the one-pulse signal (set_2) is generated. In this way, the clock signal set_2 is generated such that the switching element 1 is turned on when the on duty of the secondary current has the fixed value regardless of the magnitude or inclination of the secondary current. The clock signal set_2 with a fixed period for setting the on duty of the secondary current at the fixed value is outputted to the clock signal selector circuit 11.

As described above, in the switching power supply, control is performed such that the timing of turning off the secondary current is detected based on fluctuations in the voltage of the auxiliary winding 110C and the on duty of the secondary current is kept constant while keeping insulation between the primary side and the secondary side of the transformer 110.

Figure 4:
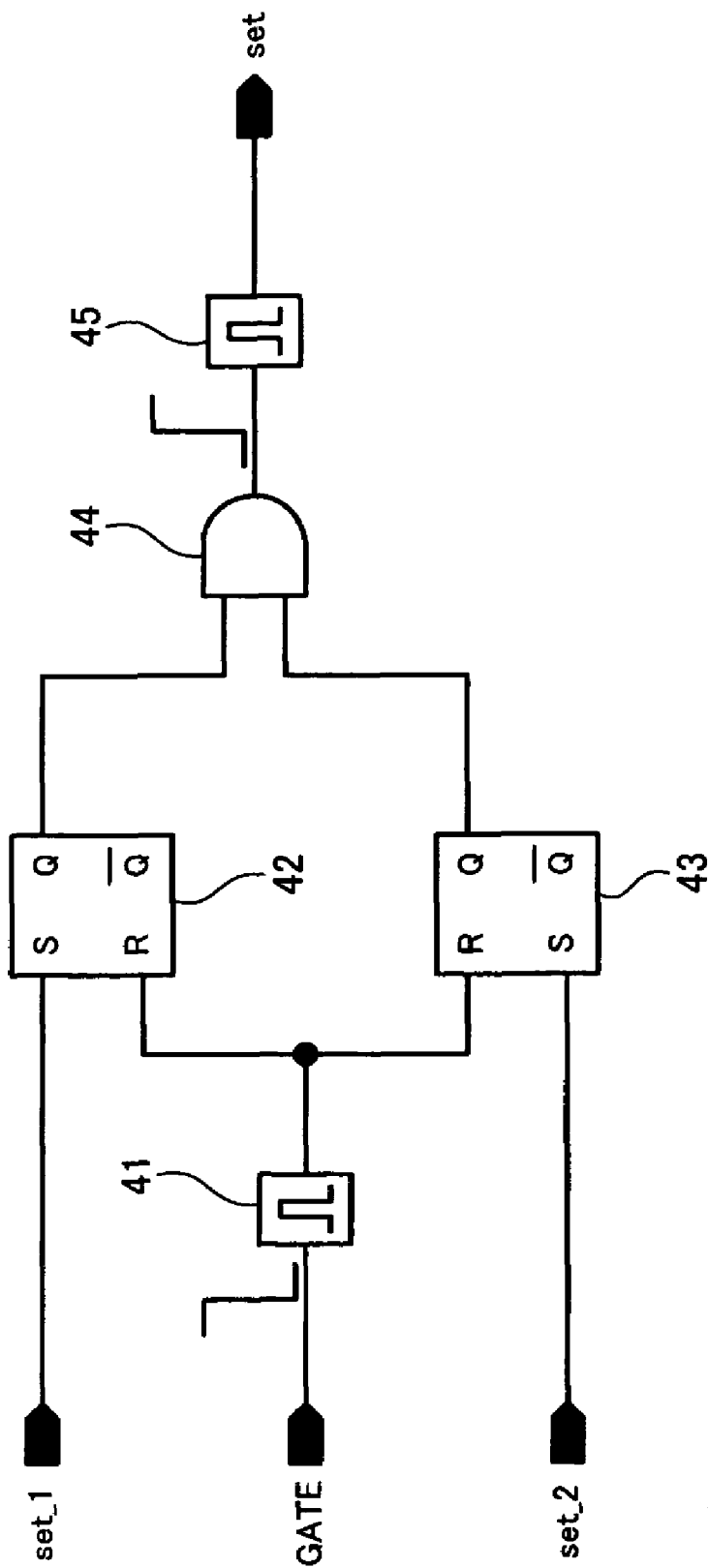
FIG. 4 is a block diagram showing a structural example of a clock signal selector circuit in the switching power supply according to the embodiment.

FIG. 4 is a block diagram showing a structural example of the clock signal selector circuit 11 which makes up a part of the semiconductor device 100 for controlling the switching power supply according to the present embodiment.

The clock signal selector circuit 11 comprises one-pulse signal generator circuits 41 and 45, flip-flop circuits 42 and 43, and an AND circuit 44. These elements are connected to one another as shown in FIG. 4.

The one-pulse signal generator circuit 41 is fed with the turn-on pulse signal which is the output signal of the gate driver 14, generates a one-pulse signal at a falling edge of the turn-on pulse signal, that is, when the switching element 1 is turned off, and inputs the one-pulse signal to the reset terminals of the flip-flop circuits 42 and 43.

The set terminal of the flip-flop circuit 42 is fed with the output signal set_1 of the oscillator 7, and the reset terminal of the flip-flop circuit 42 is fed with the output signal of the one-pulse signal generator circuit 41. The output signal of the flip-flop circuit 42 is outputted to the AND circuit 44.

The set terminal of the flip-flop circuit 43 is fed with the output signal set_2 of the secondary duty limiter circuit 10, and the reset terminal of the flip-flop circuit 43 is fed with the output signal of the one-pulse signal generator circuit 41. The output signal of the flip-flop circuit 43 is outputted to the AND circuit 44.

The AND circuit 44 is fed with the output signals of the flip-flop circuits 42 and 43. The output signal of the AND circuit 44 is outputted to the one-pulse signal generator circuit 45. When the output signal of the AND circuit 44 is inverted from low level to high level, that is, when both of the clock signal set_1 and the clock signal set_2 are inputted, the one-pulse signal generator circuit 45 generates the one-pulse signal set and outputs the signal to the set terminal of the flip-flop circuit 12.

As described above, the clock signal selector circuit 11 is fed with the output signal set_1 of the oscillator 7 and the output signal set_2 of the secondary duty limiter circuit 10, generates the set signal set when being fed with the output signals, and outputs the set signal to the set terminal of the flip-flop circuit 12. In other words, the clock signal selector circuit 11 outputs one having a lower frequency of the clock signals set_1 and set_2 to the set terminal of the flip-flop circuit 12. Therefore, when the on duty of the secondary current is lower than the fixed value, the clock signal selector circuit 11 outputs the first clock signal set_1 to the set terminal of the flip-flop circuit 12. When the on duty of the secondary current reaches the fixed value, the clock signal selector circuit 11 outputs the second clock signal set_2 to the set terminal of the flip-flop circuit 12.

Figure 5:
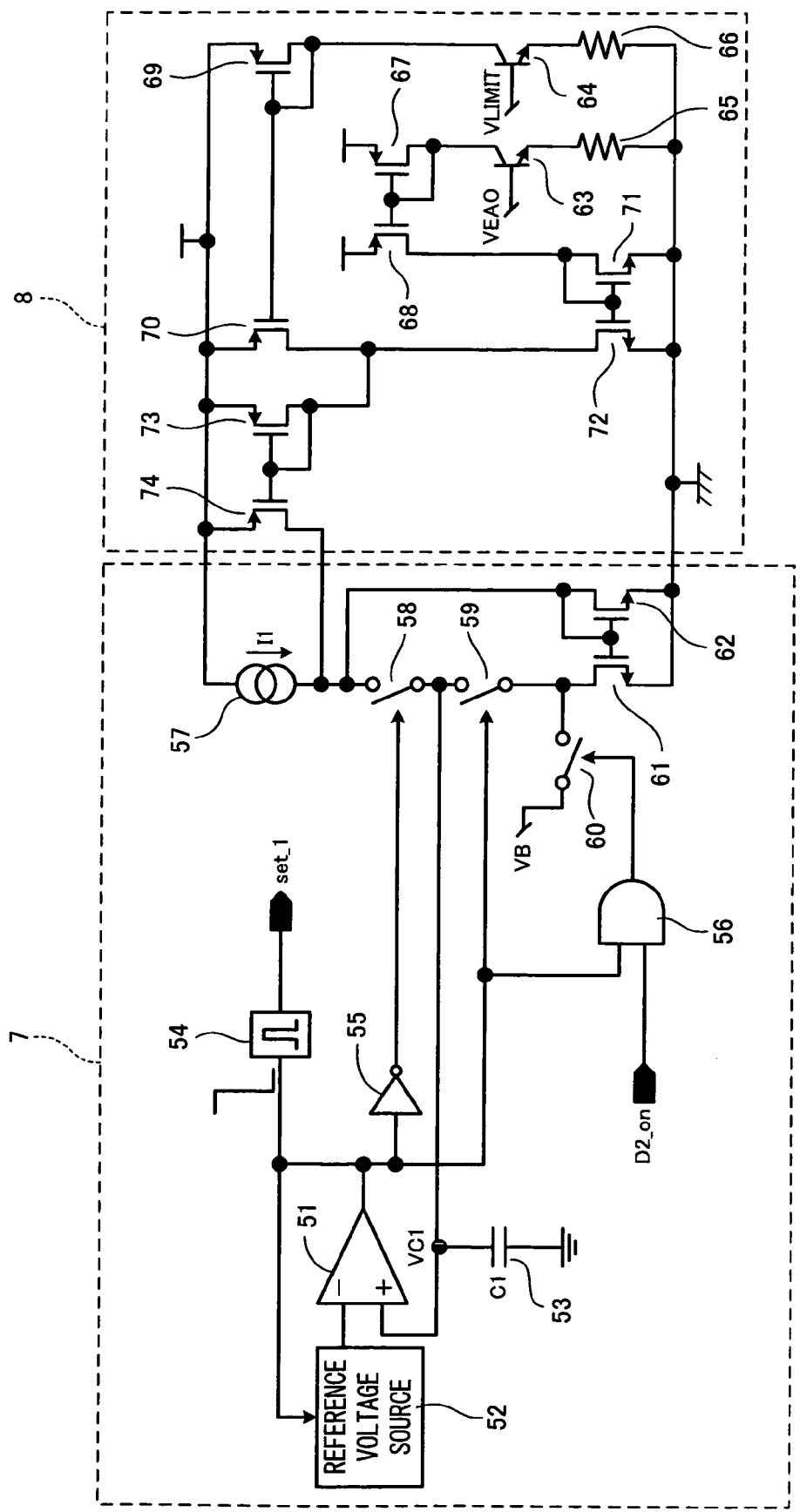
FIG. 5 is a block diagram showing a structural example of an oscillator and an oscillation frequency regulating circuit in the switching power supply according to the embodiment.

FIG. 5 is a block diagram showing a structural example of the oscillator 7 and the oscillation frequency regulating circuit 8 which make up a part of the semiconductor device 100 for controlling the switching power supply according to the present embodiment.

The oscillator 7 comprises a comparator 51, a reference voltage source 52, a capacitor 53, a one-pulse signal generator circuit 54, an inverter circuit 55, an AND circuit 56, a constant current source 57, switches 58, 59, and 60, and NchMOSFETs 61 and 62. These elements are connected to one another as shown in FIG. 5.

The comparator 51 compares a voltage VC1 of the capacitor 53 and the reference voltage of the reference voltage source 52. When the voltage VC1 of the capacitor 53 is lower than the reference voltage, the comparator 51 sets the output signal at low level. When the voltage VC1 of the capacitor 53 is higher than the reference voltage, the comparator 51 sets the output signal at high level.

Two different reference voltages V1 and V2 are set for the reference voltage source 52. The reference voltages V1 and V2 are switched according to the output signal level of the comparator 51. The reference voltage V2 is higher than the reference voltage V1. The reference voltage of the reference voltage source 52 is switched from the reference voltage V1 to the reference voltage V2 when the output signal of the comparator 51 is inverted from high level to low level. The reference voltage is switched from the reference voltage V2 to the reference voltage V1 when the output signal is inverted from low level to high level.

In other words, when the voltage VC1 of the capacitor 53 falls below the reference voltage V1, the output signal of the comparator 51 is inverted from high level to low level, the switch 58 is turned on, and the switch 59 is turned off. Therefore, a constant current I1 of the constant current source 57 charges the capacitor 53 and the voltage VC1 of the capacitor 53 increases. When the voltage VC1 of the capacitor 53 exceeds the reference voltage V2, the output signal of the comparator 51 is inverted from low level to high level, the switch 58 is turned off, and the switch 59 is turned on. Thus the capacitor 53 is discharged. A discharge current value at this moment is determined by the constant current I1 of the constant current source 57 and a current mirror circuit made up of the NchMOSFETs 61 and 62.

In this way, the switches 58 and 59 are turned on and off in response to the output signal of the comparator 51 to charge and discharge the capacitor 53. The voltage VC1 of the capacitor 53 has a waveform oscillating between the two reference voltages V1 and V2.

In the case where the output signal D2_on of the flip-flop circuit 24 in the secondary current off detection circuit 9 is set at high level, that is, in a period during which the secondary current is applied, the switch 60 is turned on. Thus when the voltage VC1 of the capacitor 53 decreases to a reference voltage VB in a discharge period, the voltage VC1 is kept at the reference voltage VB.

When the output signal of the comparator 51 is inverted from high level to low level, that is, when the capacitor 53 is switched from a discharge period to a charge period, the one-pulse signal generator circuit 54 generates the one-pulse signal set_1. Thus the clock signal set_1 with a fixed period is inputted to the clock signal selector circuit 11.

As described above, with the AND circuit 56 and the switch 60, the voltage VC1 of the capacitor 53 does not fall below the reference voltage VB in a period during which the secondary current is applied. Therefore, the one-pulse signal set_1 is not generated before the end of the application of the secondary current. In other words, the switching power supply is always operated in a discontinuous mode. In this way, the oscillator 7 generates the clock signal set_1 which has a fixed period and determines the oscillation frequency of the switching element 1, and outputs the signal to the clock signal selector circuit 11.

The oscillation frequency regulating circuit 8 comprises NPN transistors 63 and 64, resistors 65 and 66, PchMOSFETs 67, 68, 69, 70, 73, and 74, and NchMOSFETs 71 and 72. These elements are connected to one another as shown in FIG. 5.

A current proportionate to the voltage of the error voltage signal VEAO is applied to the NchMOSFET 72 through the NPN transistor 63 having a base terminal fed with the error voltage signal VEAO, the resistor 65, a current mirror circuit made up of the PchMOSFETs 67 and 68, and a current mirror circuit made up of the NchMOSFETs 71 and 72.

On the other hand, a current proportionate to the overcurrent protection reference voltage VLIMIT is applied to the PchMOSFET 70 through the NPN transistor 64 having a base terminal fed with the overcurrent protection reference voltage VLIMIT, the resistor 66, and a current mirror circuit made up of the PchMOSFETs 69 and 70.

When the current passing though the NchMOSFET 72 is lower than the current passing through the PchMOSFET 70, no current passes through a current mirror circuit made up of the PchMOSFETs 73 and 74. When the current passing though the NchMOSFET 72 is higher than the current passing through the PchMOSFET 70, a current corresponding to a difference between the current passing through the NchMOSFET 72 and the current passing through the PchMOSFET 70 is applied to the current mirror circuit made up of the PchMOSFETs 73 and 74. Then, the current passing through the PchMOSFET 74 is added to the constant current I1 of the constant current source 57 and thus the charge/discharge period of the capacitor 53 is shortened.

Therefore, when the error voltage signal VEAO is higher than the overcurrent protection reference voltage VLIMIT, the clock signal set_1 outputted from the oscillator 7 decreases in period. The larger difference between the error voltage signal VEAO and the overcurrent protection reference voltage VLIMIT, the higher frequency of the clock signal set_1.

In this way, only when the error voltage signal VEAO is higher than the overcurrent protection reference voltage VLIMIT, the oscillation frequency regulating circuit 8 generates a signal with a current value corresponding to the voltage difference and outputs the signal to the oscillator 7. Therefore, when the voltage of the error voltage signal VEAO is higher than the overcurrent protection reference voltage VLIMIT, the clock signal set_1 outputted from the oscillator 7 increases in frequency according to an increase in the voltage difference (the period is shortened).

The clock signal set_1 is inputted to the clock signal selector circuit 11. The clock signal selector circuit 11 selects the clock signal set_1 when the on duty of the secondary current is equal to or lower than the fixed value. In this way, in the case where a load increases at the secondary current having an on duty of the fixed value or less, the output current IO is equal to or higher than a predetermined value, and the error voltage signal VEAO exceeds the overcurrent protection reference voltage VLIMIT, the switching power supply performs a constant voltage operation in which an energy supply to the primary winding 110A and the secondary winding 110B is changed by changing the oscillation frequency of the switching element 1, so that the output voltage VO is kept constant.

Figure 6:
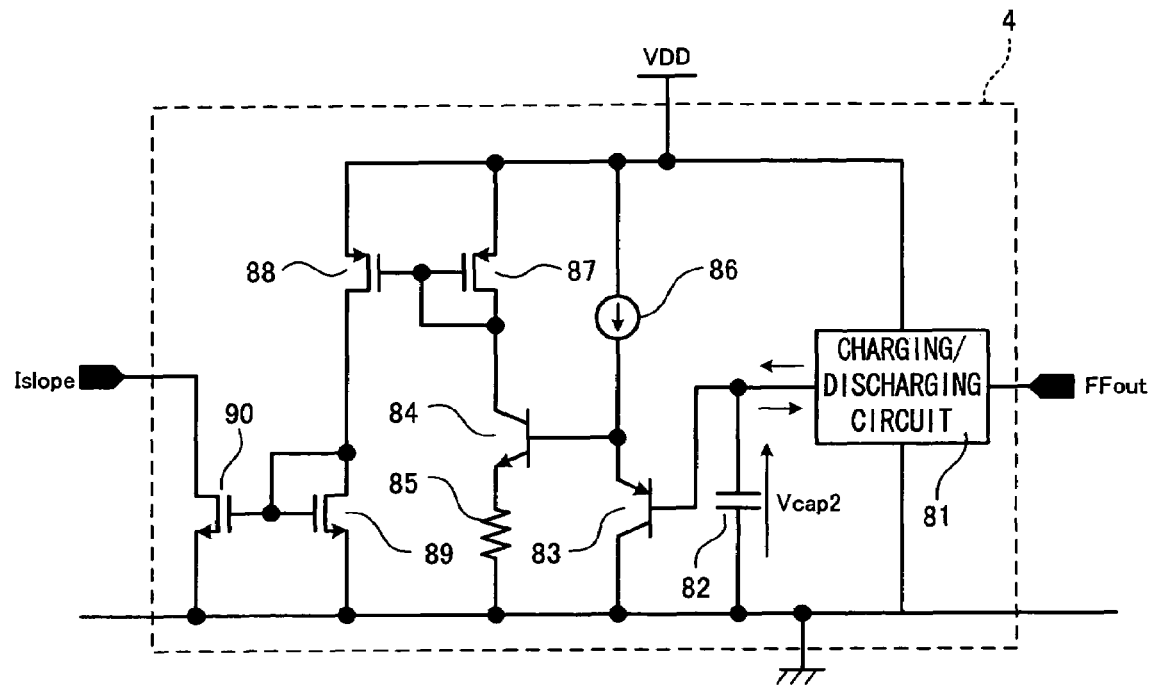
FIG. 6 is a block diagram showing a structural example of a drain current detection variable circuit in the switching power supply according to the embodiment.

FIG. 6 is a block diagram showing a structural example of the drain current detection variable circuit 4 making up a part of the semiconductor device 100 for controlling the switching power supply according to the present embodiment.

The drain current detection variable circuit 4 comprises a charging/discharging circuit 81, a capacitor 82, a PNP transistor 83, an NPN transistor 84, a resistor 85, a constant current source 86, PchMOSFETs 87 and 88, and NchMOS-FETs 89 and 90. These elements are connected to one another as shown in FIG. 6.

The charging/discharging circuit 81 is fed with an FFout signal from the flip-flop circuit 12. When the FFout signal is at high level, that is, when the switching element 1 is turned on, the charging/discharging circuit 81 charges the capacitor 82 with a constant current. When the FFout signal is at low level, that is, when the switching element 1 is turned off, the charging/discharging circuit 81 discharges the capacitor 82.

As shown in FIG. 8, a voltage Vcap2 of the capacitor 82 changes with time like a discontinuous triangular wave which keeps rising when the switching element 1 is turned on and rapidly decreases when the switching element 1 is turned off. The inclination of an increase of the triangular wave is constant because the charging/discharging circuit 81 charges the capacitor 82 with a constant current.

The voltage Vcap2 is converted to a current signal through the PNP transistor 83, the NPN transistor 84, the resistor 85, and the constant current source 86. The signal is further converted to the current signal (current limit variable signal) Islope having been multiplied by a constant through a current mirror circuit made up of the PchMOSFETs 87 and 88 and a current mirror circuit made up of the NchMOSFETs 89 and 90, and the signal is inputted to the drain current detection circuit 5. Thus the current limit variable signal Islope forms a discontinuous triangular wave which changes with time according to the time variation of the voltage Vcap2 of the capacitor 82.

Figure 7:
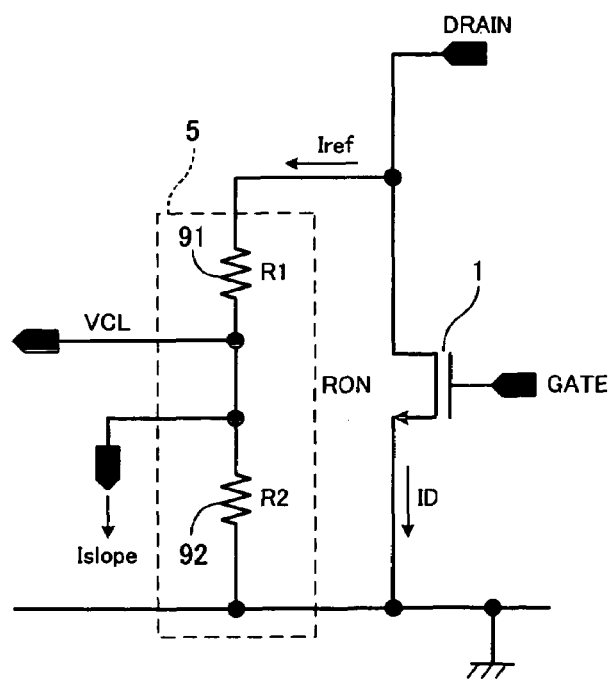
FIG. 7 is a block diagram showing a structural example of a drain current detection circuit in the switching power supply according to the embodiment.

FIG. 7 is a block diagram showing a structural example of the drain current detection circuit 5 making up a part of the semiconductor device 100 for controlling the switching power supply according to the present embodiment.

The drain current detection circuit 5 comprises resistors 91 and 92. These elements are connected to each other as shown in FIG. 7. The drain current detection circuit 5 generates an element current detection signal VCL at a voltage level corresponding to the current limit variable signal Islope and the drain current ID passing through the switching element 1.

A drain voltage VD of the switching element 1 is expressed as below:

$$VD = RON \times ID \quad (1)$$

where 'RON' represents the on resistance of the switching element 1.

Further, according to the connection of FIG. 7, the drain voltage VD of the switching element 1 is expressed as below:

$$VD = VCL + Iref \times R1' = VCL \times (R1' + R2')/R2' + Islope \times R1' \quad (2)$$

where R1' represents a resistance value of the resistor 91, 'Iref' represents a current passing through the resistor 91, and R2' represents a resistance value of the resistor 92.

According to Equations (1) and (2), the drain current ID is expressed as below:

$$ID = \{(R1' + R2') \times VCL + R1' \times R2' \times Islope\}/(RON \times R2') \quad (3)$$

When the error voltage signal VEAO is lower than the overcurrent protection reference voltage VLIMIT, the peak value Ip of the drain current ID changes in response to the error voltage signal VEAO. When the error voltage signal VEAO reaches the overcurrent protection reference voltage VLIMIT, the peak value Ip reaches the maximum value. In other words, according to Equation (3), the maximum value ILIMIT of the drain current ID is expressed as below:

$$ILIMIT = \{(R1' + R2') \times VLIMIT + R1' \times R2' \times Islope\}/(RON \times R2') \quad (4)$$

Therefore, when the error voltage signal VEAO is equal to or higher than the overcurrent protection reference voltage VLIMIT, the maximum value ILIMIT of the drain current ID changes with time according to the time variation of the current limit variable signal Islope. In other words, as shown in FIG. 8, the maximum value ILIMIT linearly changes with time between a first level and a second level higher than the first level in a period (on time Ton) during which the switching element 1 couples its input terminal and its output terminal. The maximum value ILIMIT corresponds to a current limit dictating the maximum value of the drain current ID. Therefore, by properly setting the inclination of the current limit variable signal Islope, the peak value Ip of the drain current ID determined in consideration of the overcurrent detection delay time Td is kept almost constant regardless of the input voltage VIN when the error voltage signal VEAO is equal to or higher than the overcurrent protection reference voltage VLIMIT.

Referring to the accompanying drawings, the following will describe the operations of the switching power supply thus configured.

In FIG. 1, the input terminal of the switching power supply is fed with the input voltage VIN (first direct-current voltage) which has been obtained by, for example, rectifying and smoothing a commercial alternating current power supply. The input voltage VIN is applied to the DRAIN terminal of the semiconductor device 100 through the primary winding 110A of the transformer 110.

And then, the regulator 2 supplies a current from the DRAIN terminal to the internal circuit power supply VDD according to the input voltage VIN, supplies a current to the capacitor 121 of the auxiliary power supply part via the VCC terminal according to the input voltage VIN, and increases the auxiliary power supply voltage VCC and the voltage of the internal circuit power supply VDD. When the voltage of the internal circuit power supply VDD reaches a fixed value, the switching operation of the switching element 1 is started.

When the switching operation of the switching element 1 is started, energy is supplied to the windings of the transformer 110, alternating voltage is generated on the secondary winding 110B and the auxiliary winding 110C, and current passes through the windings.

Current passing through the secondary winding 110B (secondary current) is rectified and smoothed into direct-current power (output voltage VO and output current IO) by the diode 130 and the capacitor 131, and is supplied to the load 132. Current passing through the auxiliary winding 110C is rectified and smoothed by the diode 120 and the capacitor 121, and used as the auxiliary power supply of the semiconductor device 100. The auxiliary winding 110C has the same polarity as the secondary winding 110B, and thus the auxiliary power supply voltage VCC is proportionate to the output voltage VO.

When the switching operation of the switching element 1 is started, the output voltage VO and the auxiliary power supply voltage VCC increase. When the auxiliary power supply voltage VCC increases, the error voltage signal VEAO of the error amplifier 3 decreases in voltage. When the voltage of the error voltage signal VEAO decreases, the drain current control circuit 6 controls the switching element 1 so as to reduce the drain current ID passing through the switching element 1. The switching power supply provides negative feedback thus to stabilize the output voltage VO. That is, the auxiliary power supply voltage VCC is also used to stabilize the output voltage VO.

After the switching operation is started, the regulator 2 stops supplying current to the auxiliary power supply part. When the auxiliary power supply voltage VCC becomes equal to or higher than a fixed value, the regulator 2 supplies a current from the VCC terminal to the internal circuit power supply VDD according to the auxiliary power supply voltage VCC. This operation reduces the power consumption of the semiconductor device 100 in a normal operation. When the auxiliary power supply voltage VCC falls below the fixed value, the regulator 2 supplies a current from the DRAIN terminal to the internal circuit power supply VDD according to the input voltage VIN.

The switching operation of the switching element 1 is performed by inputting the output signal of the flip-flop circuit 12 to the gate driver 14 through the NAND circuit 13.

The set terminal of the flip-flop circuit 12 is fed with the clock signal set_1 from the oscillator 7 or the clock signal set_2 from the secondary duty limiter circuit 10 through the clock signal selector circuit 11. The reset terminal of the flip-flop circuit 12 is fed with the output signal of the drain current control circuit 6. The drain current control circuit 6 generates the output signal when the element current detection signal VCL from the drain current detection circuit 5 reaches the lower one of the overcurrent protection reference voltage VLIMIT and the voltage of the error voltage signal VEAO.

Figure 9:
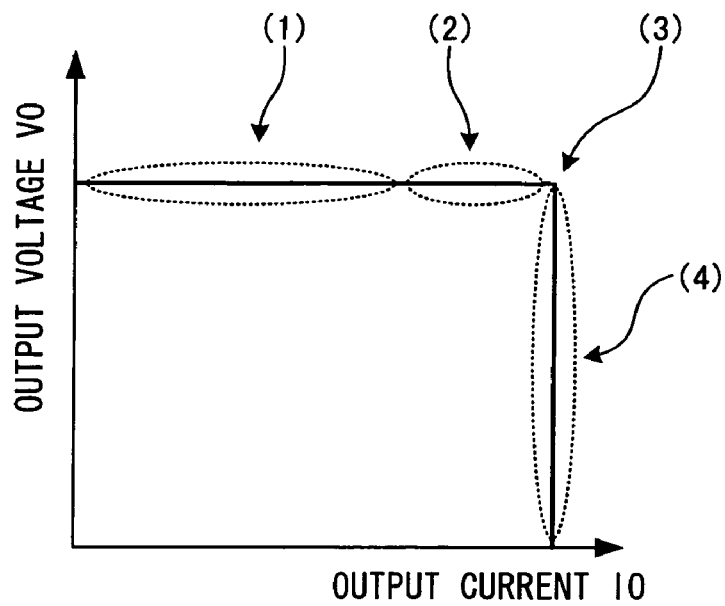
FIG. 9 is a diagram showing an output voltage-output current characteristic in the switching power supply according to the embodiment.

As shown in FIG. 9, after the switching operation of the switching element 1 is started and the output voltage VO is stabilized, an operation is varied according to a state of the output current IO passing through the load 132. The following will describe the operations of the switching power supply in the states of <(1) constant voltage region 1>, <(2) constant voltage region 2>, <(3) a borderline region between the constant voltage region and a constant current region>, and <(4) constant current region> in the order in which the load 132 changes from a light load to a heavy load.

In FIGS. 10 to 13, reference character VCC denotes the auxiliary power supply voltage, reference character VD denotes the voltage of the DRAIN terminal serving as the input terminal of the switching element 1, reference character VCL denotes the element current detection signal (drain current ID), reference character VLIMIT denotes the overcurrent protection reference voltage, reference character VEAO denotes the error voltage signal, reference character ID2 denotes current passing through the diode 130 on the secondary side, reference character VTR denotes the voltage of the TR terminal, VC1 denotes the voltage of the capacitor 53 in the oscillator 7, reference character set_1 denotes the clock signal outputted by the oscillator 7, reference character VC2 denotes the voltage of the capacitor 33 in the secondary duty limiter circuit 10, reference character set_2 denotes the clock signal outputted by the secondary duty limiter circuit 10, reference character set denotes the set signal inputted to the set terminal of the flip-flop circuit 12, and reference character VG denotes the voltage of the control terminal (gate terminal) of the switching element.

In reality, the peak value of the element current detection signal VCL (drain current ID) is higher than the overcurrent protection reference voltage VLIMIT or the error voltage signal VEAO by the overcurrent detection delay time Td, which is not shown in FIGS. 10 to 13.

<(1) Constant Voltage Region 1>

Figure 10:
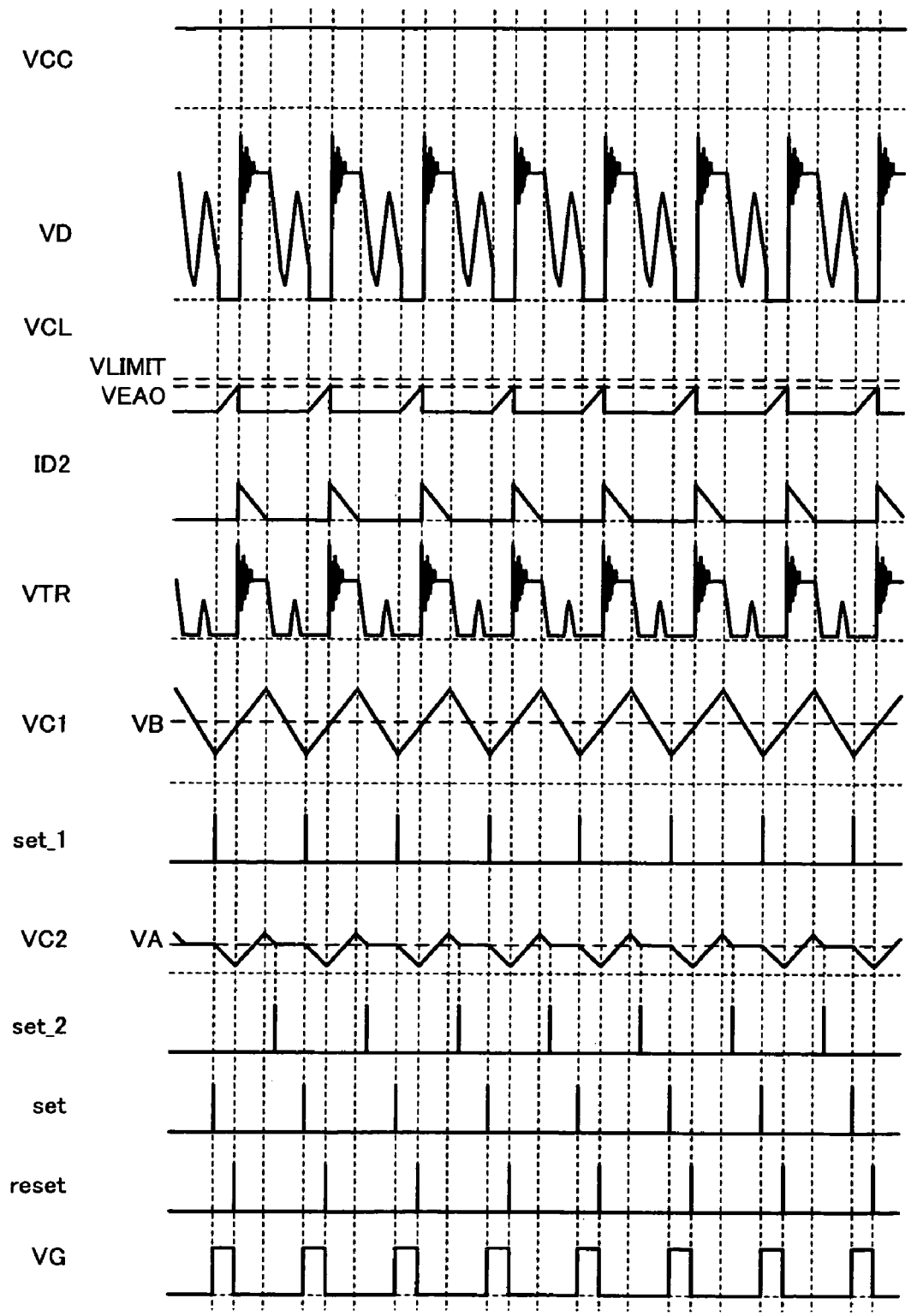
FIG. 10 is a timing chart showing the operations of <constant voltage region 1> in the switching power supply according to the embodiment.

FIG. 10 is a timing chart showing the operations of the parts of the switching power supply in <constant voltage region 1>. In <constant voltage region 1>, the error voltage signal VEAO outputted from the error amplifier 3 is lower than the overcurrent protection reference voltage VLIMIT and the output current IO is lower than a predetermined value.

In <constant voltage region 1>, the current passing through the secondary winding 110B is low and the passage of the secondary current is shortened. Thus, the output signal set_2 from the secondary duty limiter circuit 10 is outputted earlier than the output signal set_1 (set signal set) from the oscillator 7. Hence, the clock signal set_1 from the oscillator 7 is inputted to the set terminal of the flip-flop circuit 12.

In <constant voltage region 1>, for example, when the output current IO passing through the load 132 decreases, the output voltage VO and the auxiliary power supply voltage VCC slightly increase. As the auxiliary power supply voltage VCC increases, the voltage of the error voltage signal VEAO outputted from the error amplifier 3 decreases. The drain current control circuit 6 controls the switching element 1 so as to reduce the peak value Ip of the drain current ID passing through the switching element 1. Conversely, when the output current IO increases, the voltage of the error voltage signal VEAO increases as the auxiliary power supply voltage VCC decreases. The drain current control circuit 6 controls the switching element 1 so as to increase the peak value Ip of the drain current ID.

As described above, in <constant voltage region 1>, the set signal set of the switching power supply is the clock signal set_1 from the oscillator 7. The reset signal of the switching power supply is a signal generated by comparing, in the drain current control circuit 6, the element current detection signal VCL outputted from the drain current detection circuit 5 and the error voltage signal VEAO outputted from the error amplifier 3. Further, the switching power supply is brought into an operating state in response to the set signal set and the reset signal according to a peak current control system using a fixed oscillation frequency. The oscillation frequency of the switching element 1 is kept constant and the on time Ton of the switching element 1 is changed, so that an energy supply to the primary winding 110A and the secondary winding 110B is changed and the output voltage VO is kept constant.

Moreover, in <constant voltage region 1>, the switching power supply keeps constant the oscillation frequency of the switching element 1, thereby preventing ringing noise of the transformer.

<(2) Constant Voltage Region 2>

Figure 11:
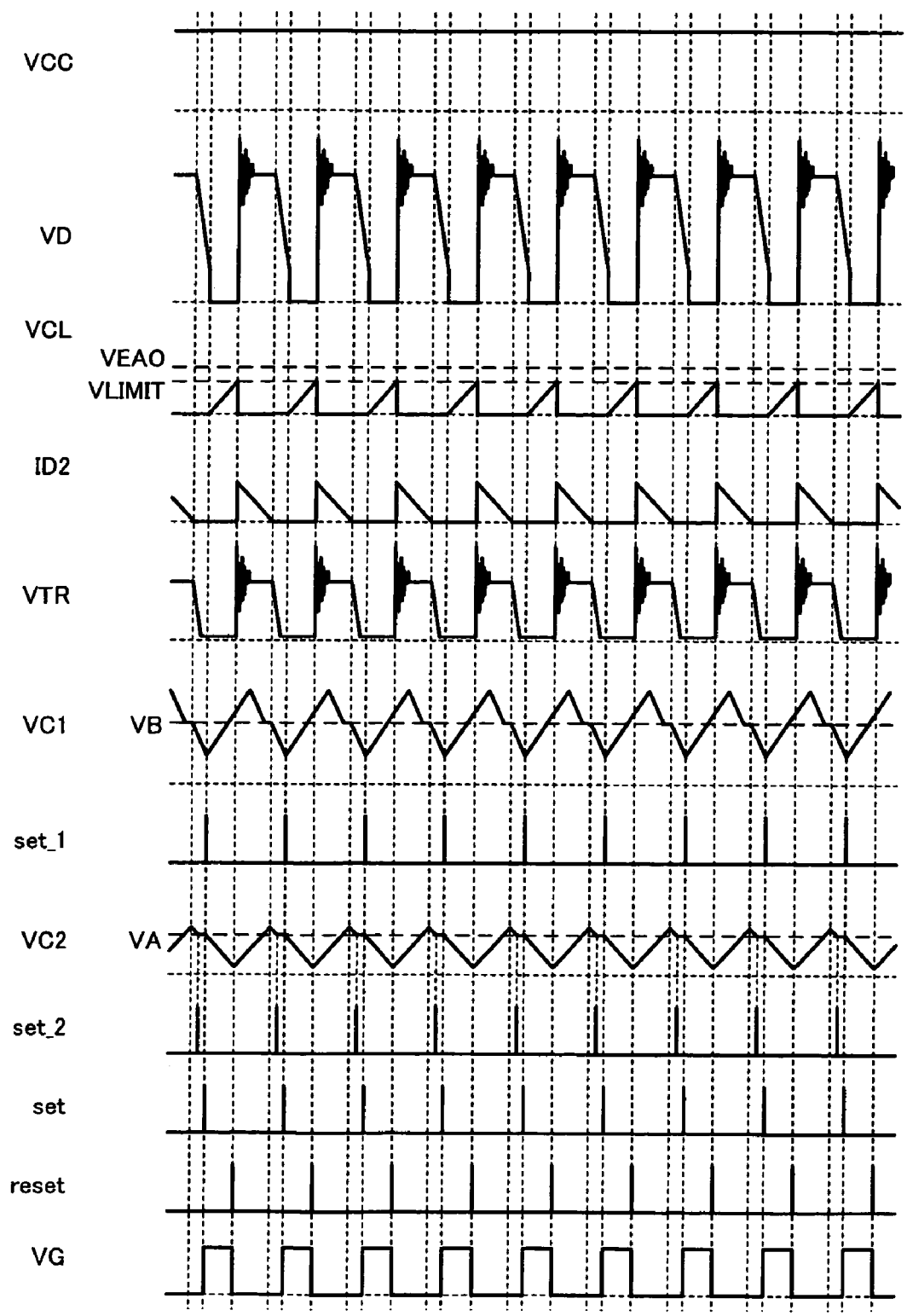
FIG. 11 is a timing chart showing the operations of <constant voltage region 2> in the switching power supply according to the embodiment.

FIG. 11 is a timing chart showing the operations of the parts of the switching power supply in <constant voltage region 2>. In <constant voltage region 2>, the load increases, the output current IO becomes equal to or higher than a predetermined value, and the error voltage signal VEAO outputted from the error amplifier 3 becomes higher than the overcurrent protection reference voltage VLIMIT.

When the output current IO passing through the load 132 is higher than that of <constant voltage region 1> and the voltage of the error voltage signal VEAO outputted from the error amplifier 3 is higher than the overcurrent protection reference voltage VLIMIT, the drain current control circuit 6 compares the element current detection signal VCL outputted from the drain current detection circuit 5 with the overcurrent protection reference voltage VLIMIT. When the element current detection signal VCL reaches the overcurrent protection reference voltage VLIMIT (fixed value), the drain current control circuit 6 generates a signal for turning off the switching element 1.

Therefore, in <constant voltage region 2>, the peak value Ip of the drain current ID passing through the switching element 1 is fixed at a current value determined by the overcurrent protection reference voltage VLIMIT.

In <constant voltage region 2>, although the current passing through the secondary winding 110B reaches the maximum value, the on duty of the secondary current does not reach the fixed value set by the secondary duty limiter circuit 10. Thus, the output signal set_2 from the secondary duty limiter circuit 10 is outputted earlier than the output signal set_1 from the oscillator 7. Hence, the clock signal set_1 (set signal set) from the oscillator 7 is inputted to the set terminal of the flip-flop circuit 12.

In the state of the voltage of the error voltage signal VEAO> the overcurrent protection reference voltage VLIMIT, the oscillation frequency regulating circuit 8 generates a signal for increasing the oscillation frequency of the switching element 1 according to a difference between the error voltage signal VEAO and the overcurrent protection reference voltage VLIMIT, and outputs the signal to the oscillator 7.

As described above, in <constant voltage region 2>, the set signal set of the switching power supply is the clock signal set_1 from the oscillator 7 having an oscillation frequency increasing with the load. The reset signal of the switching power supply is a signal generated by comparing, in the drain current control circuit 6, the element current detection signal VCL outputted from the drain current detection circuit 5 and the overcurrent protection reference voltage VLIMIT. Further, the switching power supply is brought into an operating state in response to the set signal set and the reset signal according to an oscillation frequency control system using a fixed peak current. By changing the oscillation frequency of the switching element 1, an energy supply to the primary winding 110A and the secondary winding 110B is changed and the output voltage VO is kept constant.

When the output current IO passing through the load 132 increases, the oscillation frequency of the switching element 1 increases. In the switching power supply, in a period during which the signal D2_on outputted from the secondary current off detection circuit 9 to the oscillator 7 is set at high level, the subsequent clock signal set_1 is not outputted from the oscillator 7. Thus the subsequent turn-on pulse signal is generated after the end of the application of the secondary current. That is, the switching power supply operates in a discontinuous mode.

<(3) Borderline Region Between the Constant Voltage Region and the Constant Current Region>

Figure 12:
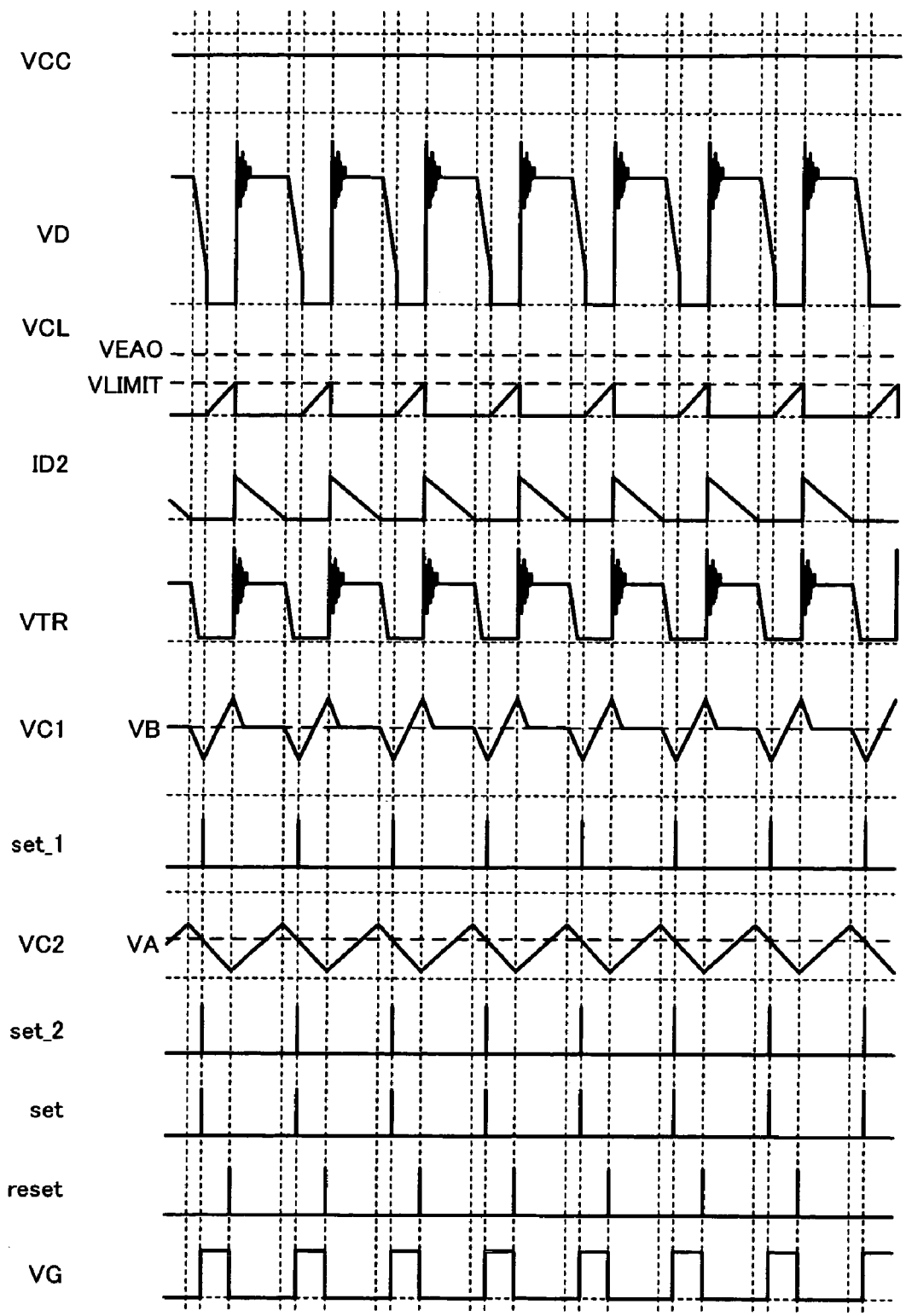
FIG. 12 is a timing chart showing the operations of <borderline region of the constant voltage region and a constant current region> in the switching power supply according to the embodiment.

FIG. 12 is a timing chart showing the operations of the parts of the switching power supply in <borderline region between the constant voltage region and the constant current region>. In <borderline region between the constant voltage region and the constant current region>, the error voltage signal VEAO outputted from the error amplifier 3 is higher than the overcurrent protection reference voltage VLIMIT and the first clock signal set_1 outputted from the oscillator 7 is synchronized with the second clock signal set_2 outputted from the secondary duty limiter circuit 10, that is, the on duty of the secondary current reaches a set value.

In <constant voltage region 2>, the peak value Ip of the drain current ID passing through the switching element 1 is fixed at a current value determined by the overcurrent protection reference voltage VLIMIT, and the oscillation frequency regulating circuit 8 increases the oscillation frequency of the clock signal set_1 as the load increases. Therefore, in <constant voltage region 2>, when the output current IO passing through the load 132 increases, the oscillation frequency of the clock signal set_1 and the on duty of the secondary current increase. And then, when the on duty of the secondary current reaches the fixed value set by the secondary duty limiter circuit 10, the clock signal set_2 from the secondary duty limiter circuit 10 is synchronized with the clock signal set_1 from the oscillator 7. As described above, <borderline region between the constant voltage region and the constant current region> is a region where the clock signal outputted from the clock signal selector circuit 11 is switched from the clock signal set_1 to the clock signal set_2, that is, a region at the instant when the on duty of the secondary current reaches the fixed value set by the secondary duty limiter circuit 10.

Since the switching power supply operates in the discontinuous mode, energy supplied to the load 132 is expressed by the equation below:

$$VO \times IO = (1/2) \times Lp \times Ip \times Ip \times fosc \quad (5)$$

where 'VO' represents an output voltage, 'IO' represents an output current, 'Lp' represents the inductance of the primary winding 110A of the transformer 110, 'Ip' represents the peak value of the drain current ID passing through the switching element 1, and 'fosc' represents the oscillation frequency of the switching element 1.

In <borderline region between the constant voltage region and the constant current region>, the error voltage signal VEAO outputted from the error amplifier 3 is higher than the overcurrent protection reference voltage VLIMIT. Thus the peak value Ip of the drain current ID is fixed at a current value determined by the overcurrent protection reference voltage VLIMIT. A current value when the switching element 1 is turned off and current starts passing through the secondary winding 110B, that is, the peak value of the secondary current is determined by a turns ratio of the primary winding 110A and the secondary winding 110B of the transformer 110, and thus the peak value of the secondary current also remains constant.

Further, when the error voltage signal VEAO is higher than the overcurrent protection reference voltage VLIMIT, the current limit ILimit dictating the maximum value of the drain current ID forms a sawtooth waveform which linearly changes with time as shown in FIG. 8. Thus, considering the overcurrent detection delay time Td, the peak value Ip of the drain current ID is kept almost constant regardless of the input voltage VIN.

When the output voltage VO is constant, the inclination of the secondary current is also constant. Thus, the secondary current is always applied for a fixed period when the secondary current has a constant peak value. Therefore, in <borderline region between the constant voltage region and the constant current region>, the secondary current is always applied for a fixed period. As a result, the oscillation frequency fosc of the switching element 1 always has a fixed value in <borderline region between the constant voltage region and the constant current region>.

On the other hand, when an inductance Lp of the primary winding 110A of the transformer 110 changes, the inclination of the secondary current also changes.

When the secondary current has a constant peak value, as the inductance Lp increases, the inclination of the secondary current increases and the secondary current is applied for a longer period. As a result, the oscillatory frequency fosc of the switching element 1 decreases.

Conversely, when the secondary current has a constant peak value and the inductance Lp decreases, the inclination of the secondary current decreases and the secondary current is applied for a shorter period. As a result, the oscillation frequency fosc of the switching element 1 increases.

As described above, in <borderline region between the constant voltage region and the constant current region>, a product of the inductance Lp of the primary winding 110A of the transformer 110 and the oscillation frequency fosc of the switching element 1 is constant. According to the Equation (5), the output current IO is kept constant. Therefore, in <borderline region between the constant voltage region and the constant current region>, the output current IO is not affected by the oscillation frequency, variations in the inductance value of the transformer, the overcurrent detection delay time Td, or the input voltage VIN.

<(4) Constant Current Region>

Figure 13:
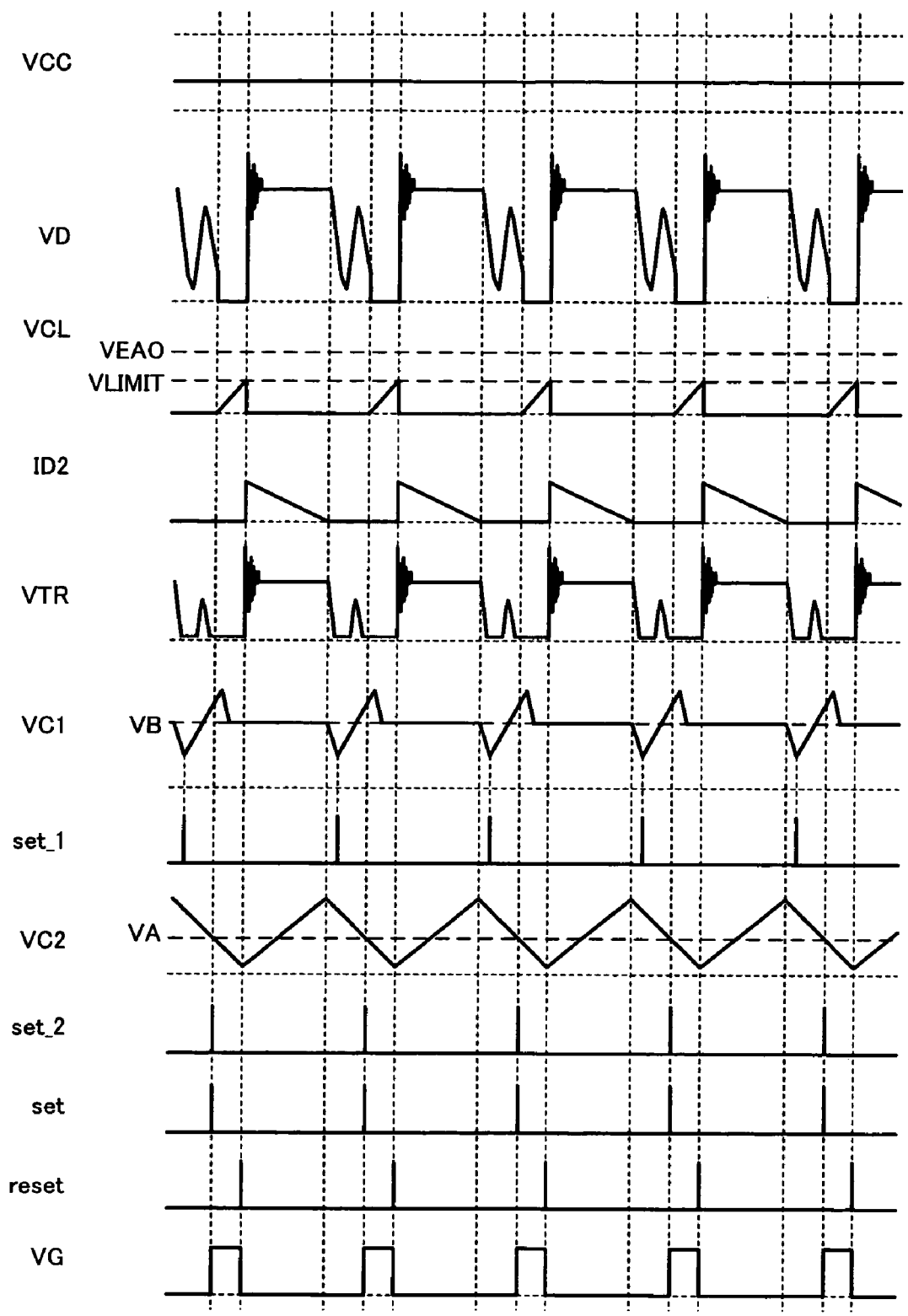
FIG. 13 is a timing chart showing the operations of <constant current region> in the switching power supply according to the embodiment.

FIG. 13 is a timing chart showing the operations of the parts of the switching power supply in <constant current region>. In <constant current region>, the error voltage signal VEAO outputted from the error amplifier 3 is higher than the overcurrent protection reference voltage VLIMIT and the switching operation of the switching element 1 is performed in response to the clock signal set_2 outputted from the secondary duty limiter circuit 10.

When the load is increased such that the output current IO passing through the load 132 becomes higher than the output current IO of <borderline region between the constant voltage region and the constant current region>, as described above, the peak value of the secondary current and the on duty of the secondary current are kept constant and the maximum energy has been already supplied to the secondary winding 110B of the transformer 110, so that the output voltage VO decreases.

When the output voltage VO decreases, the inclination of the secondary current is increased and the application of the secondary current becomes longer. Thus, the output signal set_2 is outputted from the secondary duty limiter circuit 10 earlier than the output signal set_1 outputted from the oscillator 7. Therefore, the second clock signal set_2 is outputted from the clock signal selector circuit 11.

Thus the oscillation frequency of the switching element 1 is reduced while the on duty of the secondary current is controlled at the fixed value in response to the second clock signal set_2.

In this way, in <constant current region>, as the load increases, the oscillation frequency of the switching element 1 decreases while the peak value of the secondary current and the on duty of the secondary current remain constant.

When the on duty of the secondary current has the fixed value, the output current IO is expressed by the equation below:

$$IO = (1/2) \times I2p \times D2 \qquad (6)$$

where 'D2' represents the on duty of the secondary current and 'I2p' represents the peak value of the secondary current.

The peak value I2p of the secondary current is constant because the peak value Ip of the drain current ID passing through the switching element 1 is controlled at a current value determined by the overcurrent protection reference voltage VLIMIT. Further, the current limit ILimit dictating the maximum value of the drain current ID linearly changes with time as shown in FIG. 8. Thus, considering the overcurrent detection delay time Td, the peak value Ip of the drain current ID is kept almost constant regardless of the input voltage VIN.

Therefore, in the switching power supply, it is possible to obtain the constant output current IO regardless of variations in the inductance Lp of the primary winding 110A of the transformer 110, the oscillation frequency fosc of the switching element 1, the overcurrent detection delay time Td, and the input voltage VIN, thereby achieving a constant current drooping characteristic with high accuracy and few variations.

As described above, in the switching power supply, the peak value Ip of the drain current ID passing through the switching element is set at the fixed value, the on duty of the secondary current is controlled at the fixed value, and the current limit ILimit dictating the maximum value of the drain current ID is changed with time as shown in FIG. 8. Thus as long as the inclination of the current limit variable signal Islope is properly set, the actual peak value Ip of the drain current ID determined in consideration of the overcurrent detection delay time Td is kept almost constant regardless of the input voltage VIN. Further, in the switching power supply, variations in oscillation frequency and the inductance of the transformer do not affect the constant current value of the output current IO, so that the overall variations are quite small and a constant current drooping characteristic can be obtained with high accuracy.

Moreover, in the switching power supply, the output voltage VO is kept constant until the on duty of the secondary current reaches the fixed value and the output current IO is kept constant when the on duty of the secondary current reaches the fixed value. One of the constant current drooping characteristic and the constant voltage characteristic is implemented according to the state of the load.

Additionally, in the switching power supply, the constant current drooping characteristic and the constant voltage drooping characteristic of <constant voltage region 2> are implemented by controlling the oscillation frequency of the switching element 1, so that switching is smoothly carried out from the constant voltage region to the constant current region.

In the present embodiment, the detected value of the drain current passing through the switching element 1 is changed, so that the current limit linearly changes during the on period of the switching element as shown in FIG. 8. The current limit may be obtained in a different way as long as the current limit changes from the first level to the second level higher than the first level during the on period of the switching element 1.

Figure 14:
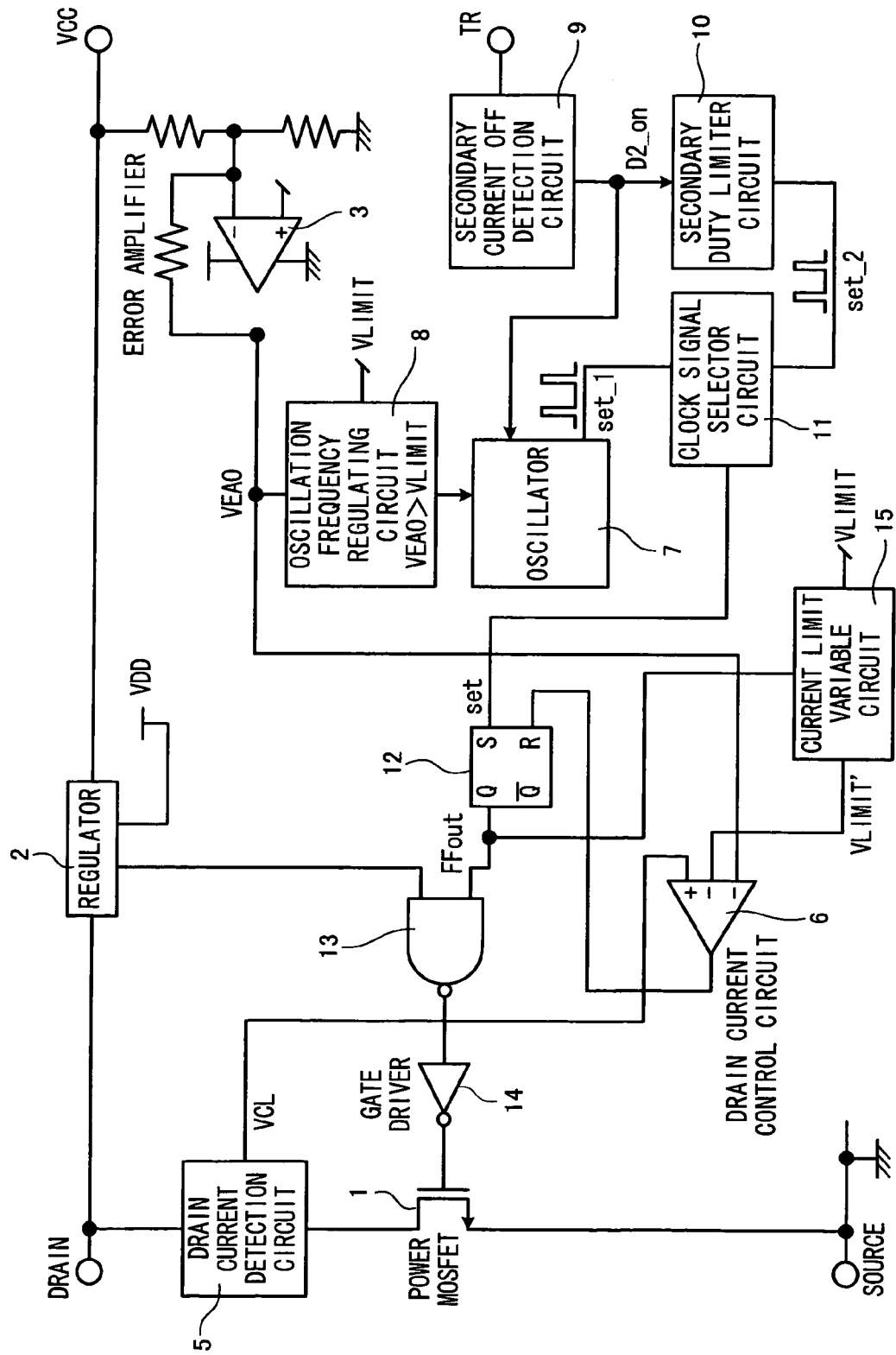
FIG. 14 is a block diagram showing a structural example of a semiconductor device making up and controlling a switching power supply according to another embodiment of the present invention.

FIG. 14 shows another structural example of the semiconductor device 100 for obtaining a current limit changing linearly during the on period of a switching element. The same members as those of FIG. 2 are indicated by the same reference numerals and the explanation thereof is omitted.

In the semiconductor device (control circuit) 100, instead of a detected value of drain current passing through a switching element 1, an overcurrent protection reference voltage inputted as a reference voltage to a drain current control circuit 6 is changed with time, so that a current limit changes from a first level to a second level higher than the first level during the on period of the switching element.

Figure 15:
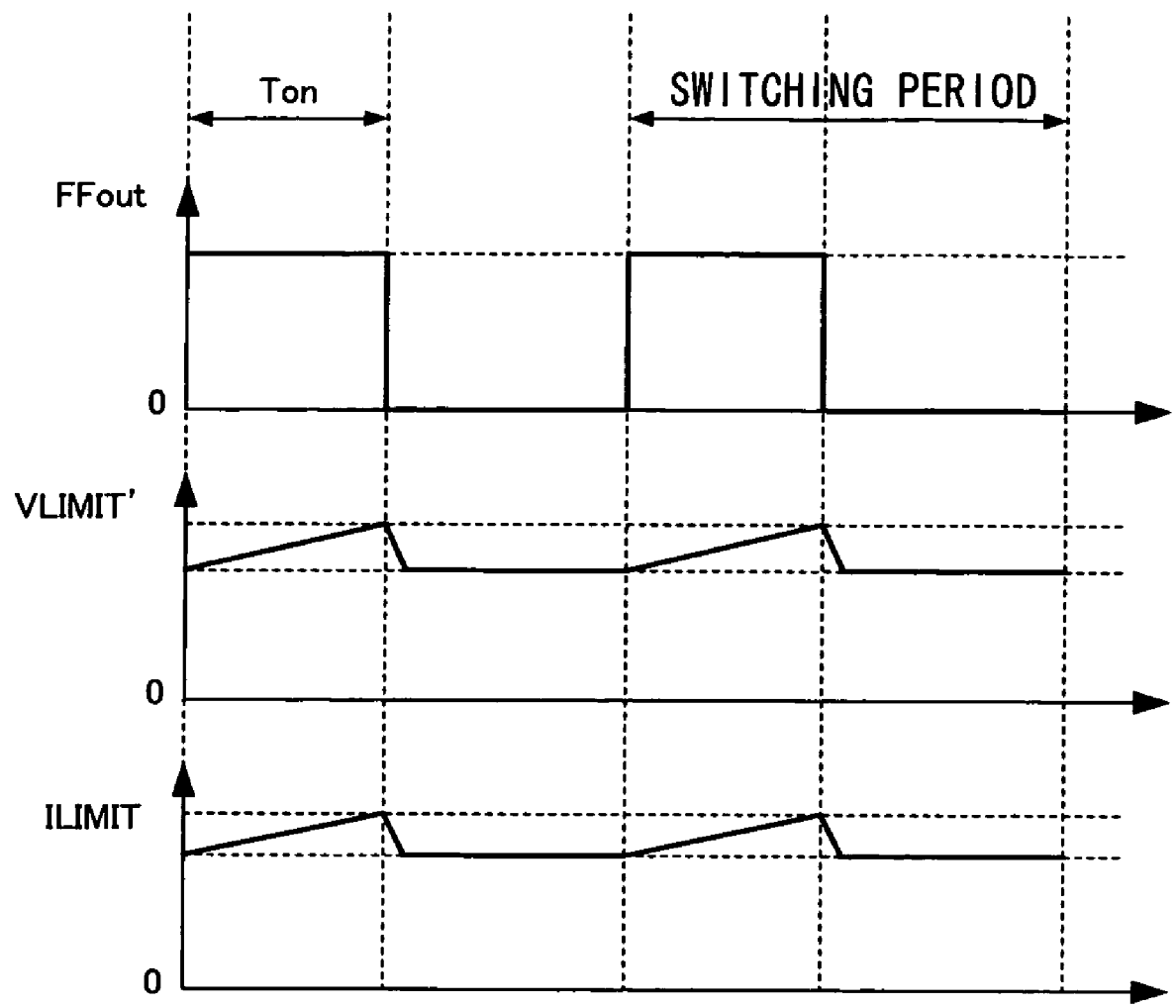
FIG. 15 is a diagram for explaining the operations of a current limit variable circuit in the switching power supply according to the embodiment.
Figure 16:
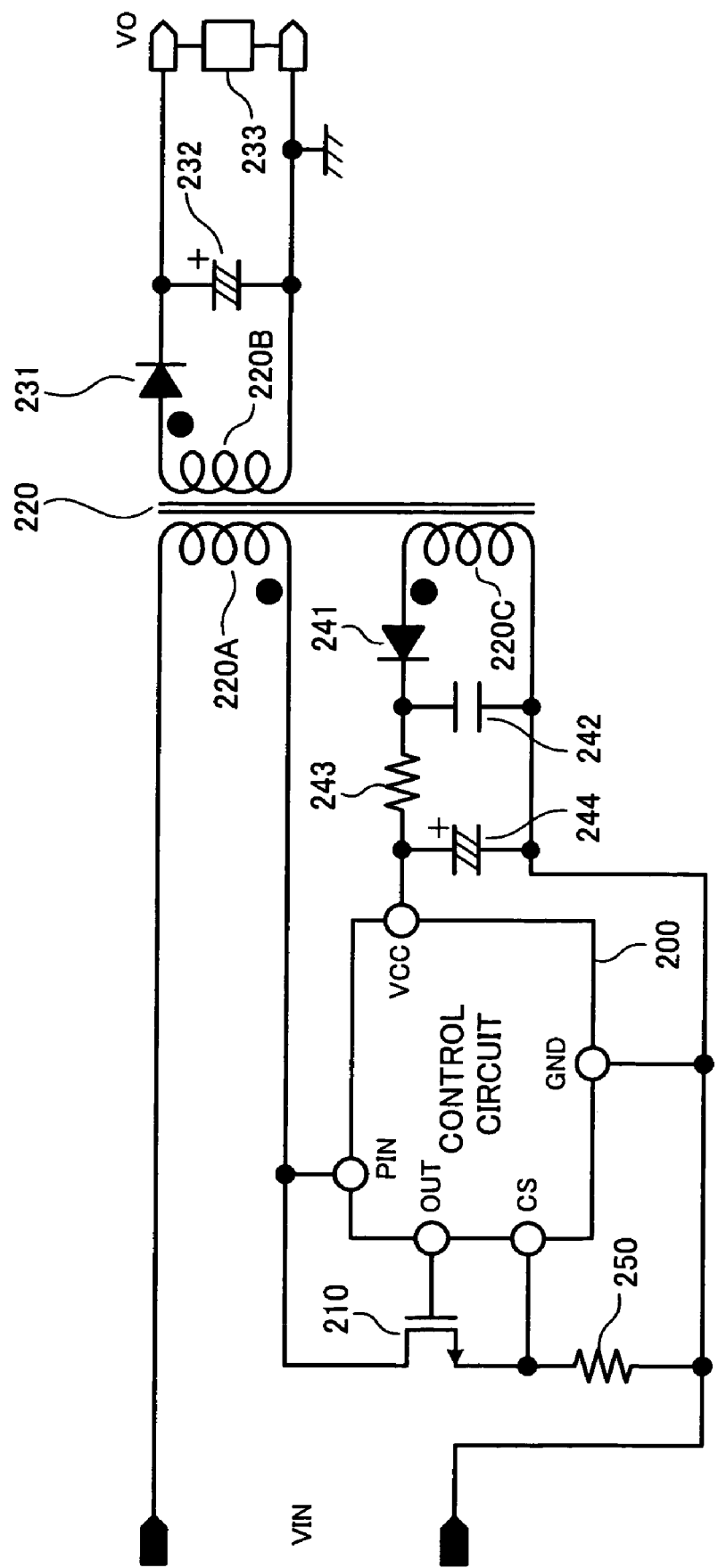
FIG. 16 is a block diagram showing the configuration of a conventional switching power supply.
Figure 17:
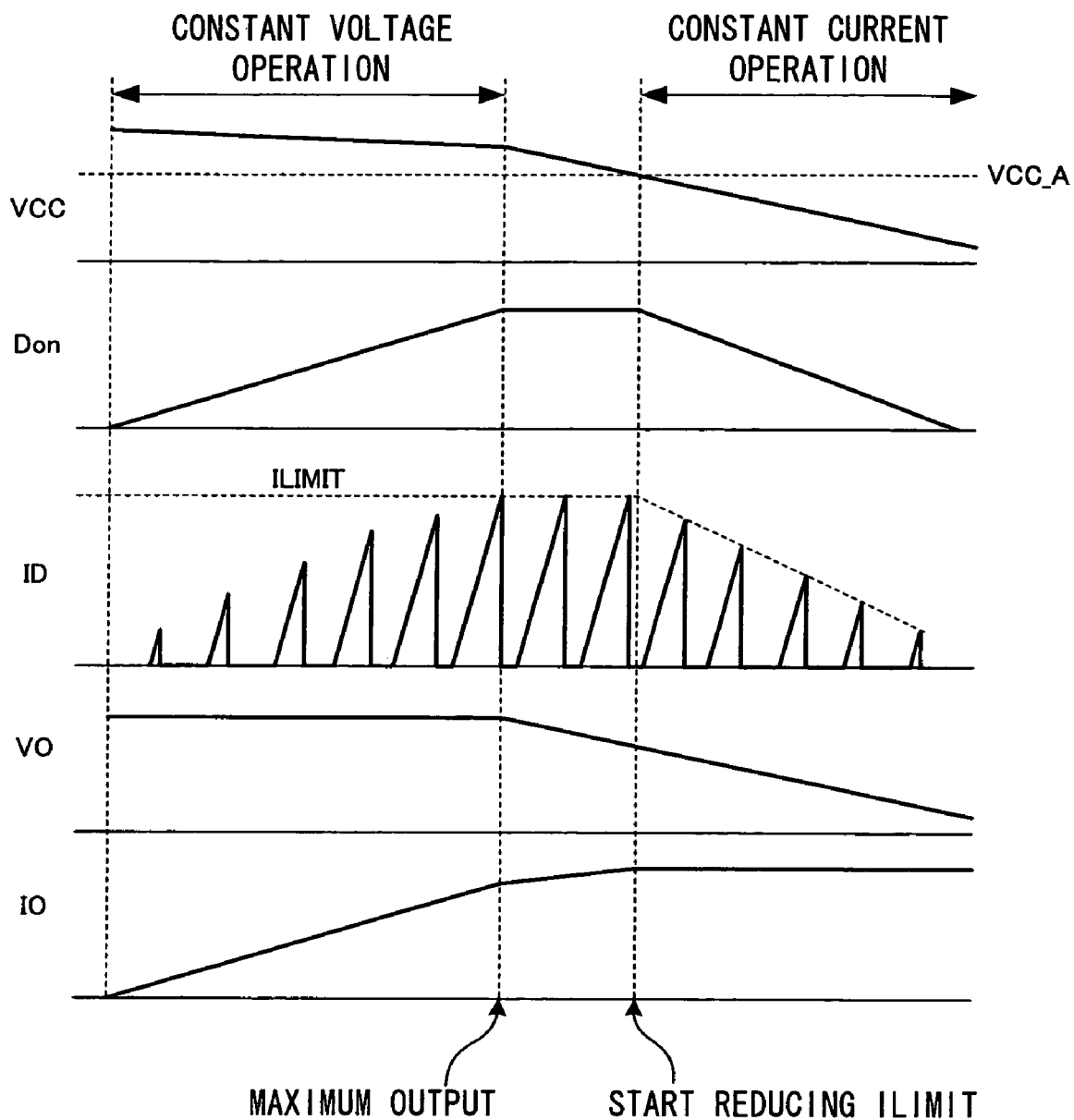
FIG. 17 is a timing chart showing the operations of parts of the conventional switching power supply.
Figure 18A:
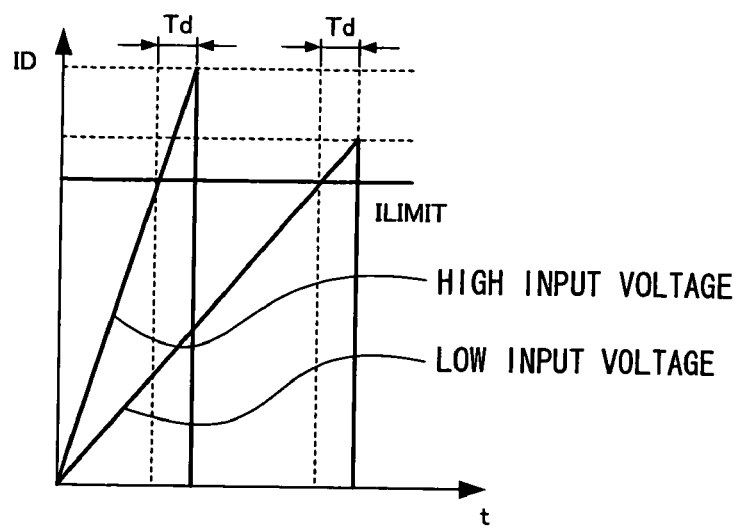
FIG. 18A shows waveforms of drain current ID when a current limit ILIMIT is constant relative to a given input voltage VIN in the conventional switching power supply.
Figure 18B:
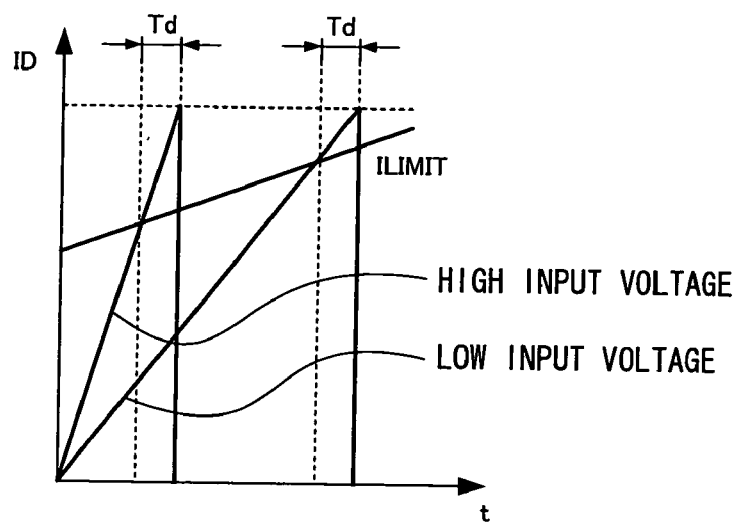
FIG. 18B is a diagram showing waveforms of the drain current ID when the current limit ILIMIT linearly changes with time in the conventional switching power supply.
Figure 18C:
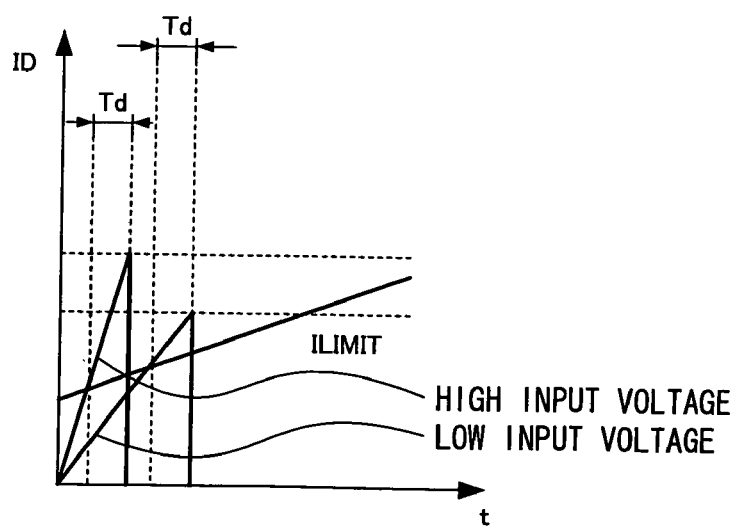
FIG. 18C is a diagram showing waveforms of a drain current ID when a peak value Ip of the drain current ID passing through a switching element is reduced in the conventional switching power supply.
Figure 19A:
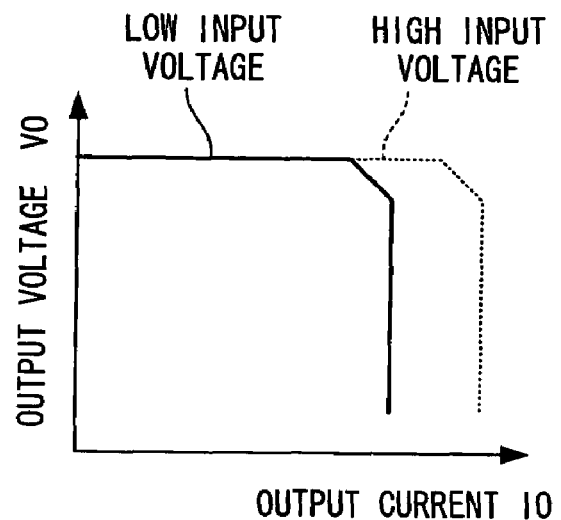
FIG. 19A is a diagram showing relationship between an output voltage VO and an output current IO when the current limit ILIMIT is constant relative to a given input voltage in the conventional switching supply.
Figure 19B:
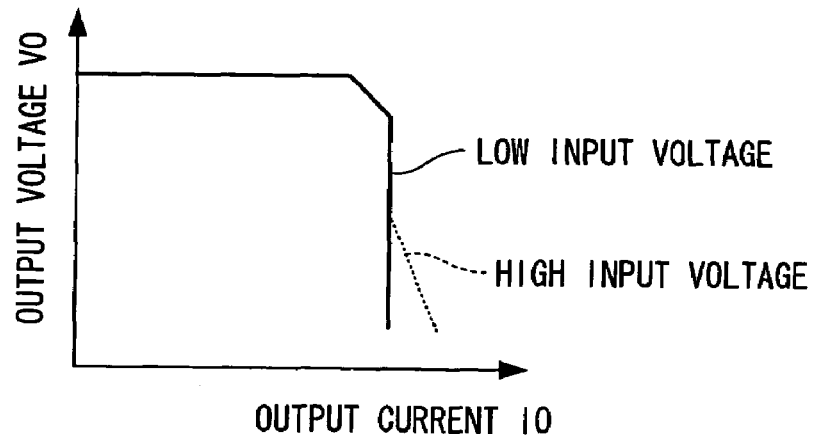
FIG. 19B is a diagram showing relationship between the output voltage VO and the output current IO when the current limit ILIMIT linearly changing with time is used in the conventional switching supply.
Figure 20:
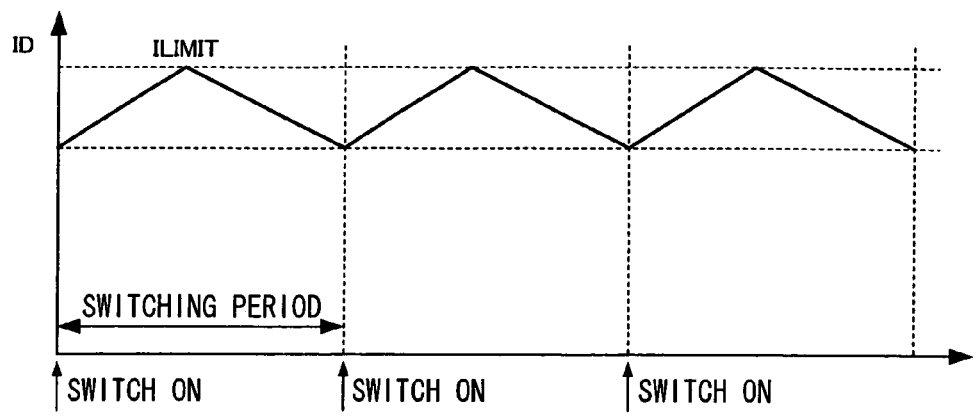
FIG. 20 is a waveform chart of the current limit ILIMIT in the conventional switching power supply.
Figure 21:
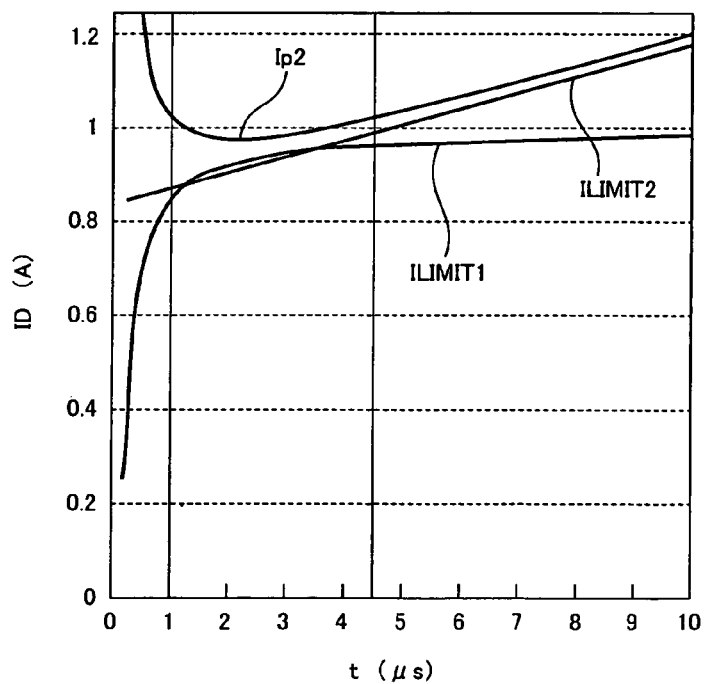
FIG. 21 is a diagram for explaining relationship between the current limit ILIMIT and the peak value of the drain current ID.

In other words, in the semiconductor device 100 of FIG. 14, the drain current detection variable circuit 4 is omitted and a current limit variable circuit 15 is added unlike the semiconductor device 100 of FIG. 2. The current limit variable circuit 15 is fed with the output signal (FFout signal) of a flip-flop circuit 12 and overcurrent protection reference voltage VLIMIT, generates overcurrent protection reference voltage VLIMIT' which changes according to the timing of turning on the switching element and the timing of turning off the switching element, and outputs the overcurrent protection reference voltage VLIMIT' to the drain current control circuit 6. In other words, the current limit variable circuit 15 has the function of generating, based on the overcurrent protection reference voltage VLIMIT set at a fixed value and the FFout signal, the overcurrent protection reference voltage VLIMIT' linearly changing with time as shown in FIG. 15.

In the case where the error voltage signal VEAO is higher than the overcurrent protection reference voltage VLIMIT', the switching element 1 is turned off when the element current detection signal VCL reaches the overcurrent protection reference voltage VLIMIT. Since the overcurrent protection reference voltage VLIMIT changes as shown in FIG. 15, current limit ILIMIT changes with time as shown in FIG. 15.

As described above, in the semiconductor device 100 of FIG. 14, the overcurrent protection reference voltage (the reference value for determining the current limit ILIMIT) inputted as the reference voltage to the drain current control circuit 6 is changed with time and thus the current limit can be changed from the first level to the second level higher than the first level during the on period of the switching element 1, so that the same effect as the semiconductor device 100 of FIG. 2 can be obtained.

What is claimed is:

1. A power supply regulation circuit, comprising:
   a transformer including a first winding fed with input voltage and a second winding for generating output voltage;
   a switching element including a first terminal, a second terminal and a control terminal, and oscillating so as to electrically couple or decouple the first and second terminals in response to a control signal received on the control terminal, so that on/off of current passing through the first winding is controlled; and
   a control circuit for generating the control signal,
   the power supply regulation circuit controlling an energy supply to the first and second windings by controlling the oscillation of the switching element, and supplying a constant output current to a load connected to the second winding,
   the control circuit having:
   an element current detection function of detecting an element current passing through the switching element;
   a current limit varying function of changing, between a first level and a second level higher than the first level, a current limit dictating a maximum value of the element current in a period during which the switching element couples the first and second terminals;
   a function of outputting a signal for turning off the switching element when the element current reaches the current limit changing between the first and second levels;
   a function of detecting an on duty of secondary current passing through the second winding, and outputting a signal for turning on the switching element so as to keep the on duty of the secondary current at a fixed value; and
   a function of generating the control signal based on the signal for turning on the switching element and the signal for turning off the switching element.

2. The power supply regulation circuit according to claim 1, wherein the current limit varying function changes a detected value of the element current having been detected by the element current detection function, so as to change the current limit between the first level and the second level in the period during which the switching element couples the first and second terminals.

3. The power supply regulation circuit according to claim 1, wherein the current limit varying function changes a reference value for determining the current limit so as to change the current limit between the first level and the second level in the period during which the switching element couples the first and second terminals.

4. The power supply regulation circuit according to claim 1, wherein the transformer further includes a third winding for detecting a voltage generated on the second winding, and the control circuit detects the on duty of the secondary current based on a voltage generated on the third winding.

5. The power supply regulation circuit according to claim 1, wherein the control circuit further has a function of changing the energy supply so as to keep the output voltage constant when the on duty of the secondary current is not higher than the fixed value.

6. The power supply regulation circuit according to claim 5, wherein when the on duty of the secondary current is not higher than the fixed value, the control circuit changes the energy supply by changing an oscillation frequency of the switching element so as to keep the output voltage constant.

7. The power supply regulation circuit according to claim 5, wherein when the on duty of the secondary current is not higher than the fixed value, the control circuit changes the energy supply by changing the period during which the switching element couples the first and second terminals, while keeping an oscillation frequency of the switching element constant, so as to keep the output voltage constant.

8. The power supply regulation circuit according to claim 5, wherein
   when the on duty of the secondary current is not higher than the fixed value and the output current is lower than a predetermined value, the control circuit changes the energy supply by changing the period during which the switching element couples the first and second terminals, while keeping an oscillation frequency of the switching element constant, so as to keep the output voltage constant, and
   when the on duty of the secondary current is not higher than the fixed value and the output current is not lower than the predetermined value, the control circuit changes the energy supply by changing the oscillation frequency of the switching element so as to keep the output voltage constant.

9. The power supply regulation circuit according to claim 1, wherein the control circuit is formed on a semiconductor substrate thereof.

10. The power supply regulation circuit according to claim 1, wherein the switching element and the control circuit are formed on a semiconductor substrate thereof.

11. A semiconductor device including on a semiconductor substrate thereof the control circuit according to claim 1.

12. A semiconductor device including on a semiconductor substrate thereof the switching element and the control circuit each according to claim 1.

* * * * *